United States Patent
Sasaki et al.

(10) Patent No.: US 10,640,409 B2
(45) Date of Patent: May 5, 2020

(54) METHOD OF MANUFACTURING GLASS CONTAINER

(71) Applicant: KOA GLASS CO., LTD., Edogawa-ku, Tokyo (JP)

(72) Inventors: Yuya Sasaki, Ichikawa (JP); Kenjirou Arai, Ichikawa (JP)

(73) Assignee: KOA GLASS CO., LTD., Edogawa-ku, Tokyo (JP)

( * ) Notice: Subject to any disclaimer, the term of this patent is extended or adjusted under 35 U.S.C. 154(b) by 0 days.

(21) Appl. No.: 15/576,722

(22) PCT Filed: Feb. 13, 2017

(86) PCT No.: PCT/JP2017/005105
§ 371 (c)(1),
(2) Date: Nov. 24, 2017

(87) PCT Pub. No.: WO2018/123073
PCT Pub. Date: Jul. 5, 2018

(65) Prior Publication Data
US 2019/0218129 A1    Jul. 18, 2019

(30) Foreign Application Priority Data

Dec. 28, 2016  (JP) .................. 2016-256335

(51) Int. Cl.
*C03B 9/31* (2006.01)
*C03B 9/335* (2006.01)
(Continued)

(52) U.S. Cl.
CPC ............. *C03B 9/31* (2013.01); *B65D 1/0261* (2013.01); *B65D 1/40* (2013.01); *B65D 85/48* (2013.01);
(Continued)

(58) Field of Classification Search
CPC .. C03B 9/14; C03B 9/31; C03B 9/335; B65D 1/00; B65D 1/0261; B65D 23/00; B65D 1/40
See application file for complete search history.

(56) References Cited

FOREIGN PATENT DOCUMENTS

| JP | S55-007503 A | 1/1980 |
|---|---|---|
| JP | S55-085428 A | 6/1980 |

(Continued)

OTHER PUBLICATIONS

JP59046895B Dialog Patents Machine Translation, performed Sep. 25, 2019. (Year: 2019).*

(Continued)

*Primary Examiner* — Lisa L Herring
(74) *Attorney, Agent, or Firm* — Yokoi & Co., U.S.A.; Toshiyuki Yokoi

(57) ABSTRACT

There is provided a method of manufacturing a glass container that can manufacture a glass container, which includes a bubble formed in a bottom portion and independent of the outside, with high yield by accurately controlling the position and size of the bubble.

A method of manufacturing a glass container that includes a mouth portion, a body portion, and a bottom portion, includes: a step of molding a glass container, in which a bubble is not yet formed, from molten glass; a step of forming a bubble-forming passage by pulling out a needle-like member after inserting the needle-like member into a bottom portion of the glass container in which a bubble is not yet formed; a step of injecting air from an inlet of the bubble-forming passage to form a reverse teardrop-shaped internal space, which is widened in the bottom portion from the bubble-forming passage as a starting point, in the bottom portion of the glass container in which a bubble is not yet formed, and to obtain a glass container that includes an (Continued)

internal space communicating with the outside; and a step of closing an inlet side of the reverse teardrop-shaped internal space by flow of not yet cured glass, which is caused by the potential heat of the not yet cured glass, to obtain a glass container that includes a bubble formed in the bottom portion and independent of the outside.

8 Claims, 11 Drawing Sheets

(51) Int. Cl.
    *B65D 1/02*     (2006.01)
    *B65D 1/40*     (2006.01)
    *B65D 85/48*     (2006.01)
    *C03B 9/16*     (2006.01)
    *C03B 9/14*     (2006.01)

(52) U.S. Cl.
    CPC .............. *C03B 9/145* (2013.01); *C03B 9/165* (2013.01); *C03B 9/335* (2013.01); *C03B 9/14* (2013.01)

(56) References Cited

FOREIGN PATENT DOCUMENTS

| JP | 59046895 B | * | 11/1984 |
|----|------------|---|---------|
| JP | 2002020128 A | * | 1/2002 |

OTHER PUBLICATIONS

JP2002-020128A Google Patents Machine Translation, performed Sep. 25, 2019. (Year: 2019).*
Extended European Search Report dated Oct. 11, 2019.

* cited by examiner

METHOD OF MANUFACTURING GLASS CONTAINER

TECHNICAL FIELD

The present invention relates to a method of manufacturing a glass container that includes a bubble formed in a bottom portion thereof and independent of the outside.

Particularly, the present invention relates to a method of manufacturing a glass container that can manufacture a glass container, which includes a bubble formed in a bottom portion and independent of the outside, with high yield by accurately controlling the position and size of the bubble.

BACKGROUND ART

In the past, since a glass container is excellent in recyclability and storage stability for contents and has weight and unique texture not provided in a plastic container, a glass container has been widely used as a container that stores cosmetics, perfume, or the like.

Further, containers that store cosmetics, perfume, and the like require functionality and the beauty and classiness of appearance based on an excellent design in terms of inducing customers to buy.

Furthermore, a glass container, which includes a bubble formed in a bottom portion, is proposed as one of glass containers having excellent designs and classiness, and is highly evaluated as a container having a unique design effect.

However, since the position and size of a bubble need to be appropriately and finely adjusted in the manufacture of a glass container that includes a bubble in a bottom portion, the glass container is generally manufactured by semi-manual steps that are performed by artisans. For this reason, there is a problem that it is difficult to mass-produce glass containers.

Accordingly, a method of industrially mass-manufacturing a glass container, which includes a bubble formed in a bottom portion, by an automatic molding machine is proposed (for example, see Patent Documents 1 and 2).

That is, Patent Document 1 discloses a method of manufacturing a glass container. As illustrated in FIG. 10, the method of manufacturing a glass container includes: a step of pushing a predetermined amount of air to molten glass 705 present in an orifice 704 of a gob feeder 701 from a tip portion of a plunger 702, which vertically reciprocates to continuously extrude molten glass 705 from the orifice 704; a step of extruding the molten glass 705 from the orifice 704 by the plunger 702 as the molten glass 705 including an air bubble 709; a step of cutting glass gob 712 by a shearing mechanism 711 and supplying the glass gob 712 to a molding machine; and a step of molding bubble-including glass container by a press molding method or a press-and-blow molding method.

Further, Patent Document 2 discloses a method of manufacturing a glass container that includes a bubble put in a bottom portion. As illustrated in FIG. 11, the method of manufacturing a glass container includes: a step of forming a dent on a parison 805 or the bottom face of a glass container 812, which obtained immediately after blow molding, by a pin 810 provided in a mold 807 for molding the bottom portion of a glass container 812; and a step of forming a bubble 814 by blowing air into the dent.

CITATION LIST

Patent Document

Patent Document 1: JP 55-7503 A (claims and the like)
Patent Document 2: JP 55-85428 A (claims and the like)

SUMMARY OF THE INVENTION

Problem to be Solved by the Invention

However, since a bubble needs to be enclosed in unmolded molten glass in the method of manufacturing a glass container disclosed in Patent Document 1, a bubble independent of the outside is obtained but there is a problem that the position and size of the bubble of a bottom portion of a final product cannot be accurately controlled.

Further, since a bubble is formed in the parison or the glass container, which obtained immediately after blow molding, in the method of manufacturing a glass container disclosed in Patent Document 2, a glass container, which includes a bubble formed at a predetermined position in the bottom portion, can be relatively stably obtained.

However, a method of forming a bubble disclosed in Patent Document 2 includes a step of blowing air to a small dent, which is formed on the bottom face of the glass container, as a starting point and a step of pushing and widening the dent to form a bubble.

For this reason, since an inlet portion of the dent is also pushed and widened and is widely opened, it is very difficult to completely close the inlet portion of the dent while a bubble remains even though the flow of not yet cured glass, which is caused by the potential heat of the not yet cured glass, is used.

Accordingly, there is a problem that a bubble independent of the outside cannot be formed in the method of manufacturing a glass container disclosed in Patent Document 2.

Therefore, the inventors of the invention have performed the earnest investigation in consideration of the above-mentioned problems. As a result, the inventors found that a predetermined passage is formed in a bottom portion of a glass container, which have been subjected to blow molding in a finishing mold, by a needle-like member and air is then injected into the passage, so that an internal space having a predetermined shape is formed.

Then, the inventors found that the inlet side of the internal space having a predetermined shape is stably closed by the flow of not yet cured glass, which is caused by the potential heat of the not yet cured glass, and a bubble independent of the outside can be accurately formed in the bottom portion. As a result, the inventors completed the invention.

That is, an object of the invention is to provide a method of manufacturing a glass container that can manufacture a glass container, which includes a bubble formed in a bottom portion and independent of the outside, with high yield by accurately controlling the position and size of the bubble.

Means for Solving Problem

According to the invention, a method of manufacturing a glass container, which includes a mouth portion, a body portion, and a bottom portion, including the following steps (A) to (D) is provided and the above-mentioned problems can be solved.

A step (A) of molding a glass container, in which a bubble is not yet formed, from molten glass A step (B) of forming a bubble-forming passage by pulling out a needle-like member after inserting the needle-like member into a bottom portion of the glass container, in which a bubble is not yet formed, from a bottom face A step (C) of injecting air from an inlet of the bubble-forming passage to form a reverse teardrop-shaped internal space, which is widened in the bottom portion from the bubble-forming passage as a starting point, in the bottom portion of the glass container in which a bubble is not yet formed, and to obtain a glass container that includes an internal space formed in the bottom portion and communicating with the outside A step (D) of closing an inlet side of the reverse teardrop-shaped internal space of the glass container, which includes the internal space formed in the bottom portion and communicating with the outside, by flow of not yet cured glass, which is caused by the potential heat of the not yet cured glass, to obtain a glass container that includes a bubble formed in the bottom portion and independent of the outside That is, according to the method of manufacturing a glass container of the invention, a predetermined bubble-forming passage is formed in the bottom portion of the glass container, in which a bubble is not yet formed, by the needle-like member and air is injected into the bubble-forming passage. As a result, the reverse teardrop-shaped internal space can be formed in the bottom portion.

Accordingly, uncured glass is made to flow using reheating, which is caused by the potential heat of not yet cured glass (hereinafter, referred to as "uncured glass"), to stably close only the inlet side of the reverse teardrop-shaped internal space, so that a bubble independent of the outside can be accurately formed in the bottom portion.

Therefore, according to the method of manufacturing a glass container of the invention, it is possible to manufacture a glass container, which includes a bubble formed in a bottom portion and independent of the outside, with high yield by accurately controlling the position and size of the bubble.

Further, when the method of manufacturing a glass container of the invention is performed, it is preferable that, in the step (B), a time, which is to elapse until the needle-like member starts to be inserted, is set to a value within the range of 0.01 to 0.5 sec immediately after the completion of the step (A) and a time, which is to elapse until the needle-like member starts to be pulled out, is set to a value within the range of 0.05 to 0.5 sec immediately after the completion of the insertion of the needle-like member.

Since the method of manufacturing a glass container of the invention is performed in this way, a predetermined bubble-forming passage can be more stably formed. Accordingly, the reverse teardrop-shaped internal space to be formed thereafter can be more stably formed, a bubble independent of the outside can be more stably formed eventually, and the position and size of the bubble can be more accurately controlled.

Furthermore, when the method of manufacturing a glass container of the invention is performed, it is preferable that, in the step (B), the depth of the bubble-forming passage from the bottom face, which is obtained immediately after the needle-like member is pulled out, is set to a value within the range of 20 to 80% of the thickness of the bottom portion in a longitudinal direction.

Since the method of manufacturing a glass container of the invention is performed in this way, a predetermined bubble-forming passage can be more stably formed. Accordingly, the reverse teardrop-shaped internal space to be formed thereafter can be more stably formed, a bubble independent of the outside can be more stably formed eventually, and the position and size of the bubble can be more accurately controlled.

Moreover, when the method of manufacturing a glass container of the invention is performed, it is preferable that, in the step (B), the maximum diameter of the bubble-forming passage, which is formed immediately after the needle-like member is pulled out, is set to a value within the range of 0.5 to 5 mm.

Since the method of manufacturing a glass container of the invention is performed in this way, a predetermined bubble-forming passage can be more stably formed. Accordingly, the reverse teardrop-shaped internal space to be formed thereafter can be more stably formed, a bubble independent of the outside can be more stably formed eventually, and the position and size of the bubble can be more accurately controlled.

Further, when the method of manufacturing a glass container of the invention is performed, it is preferable that, in the step (B), the shape of the cross-section of the bubble-forming passage, which is formed immediately after the needle-like member is pulled out, taken along a plane orthogonal to an axis of the bubble-forming passage is at least one selected from the group consisting of a circular shape, an oval shape, and a polygonal shape.

Since the method of manufacturing a glass container of the invention is performed in this way, a predetermined bubble-forming passage can be more stably formed. Accordingly, the reverse teardrop-shaped internal space to be formed thereafter can be more stably formed, a bubble independent of the outside can be more stably formed eventually, and the position and size of the bubble can be more accurately controlled.

Furthermore, when the method of manufacturing a glass container of the invention is performed, it is preferable that, in the step (B), an insertion direction of the needle-like member is set to correspond to an upper side in a vertical direction.

Since the method of manufacturing a glass container of the invention is performed in this way, a predetermined bubble-forming passage can be more stably formed. Accordingly, the reverse teardrop-shaped internal space to be formed thereafter can be more stably formed, a bubble independent of the outside can be more stably formed eventually, and the position and size of the bubble can be more accurately controlled.

Moreover, when the method of manufacturing a glass container of the invention is performed, it is preferable that the thickness of the bottom portion in the longitudinal direction is set to a value within the range of 20 to 100 mm and the maximum diameter of the bottom portion is set to a value within the range of 30 to 80 mm.

Since the method of manufacturing a glass container of the invention is performed in this way, the reverse teardrop-shaped internal space can be more stably formed and the inlet side of the reverse teardrop-shaped space can be more stably closed by the flow of uncured glass that uses reheating caused by the potential heat of uncured glass. Accordingly, a bubble independent of the outside can be more stably formed and the position and size of the bubble can be more accurately controlled.

Meanwhile, "the maximum diameter of the bottom portion" means the maximum diameter in the cross-section of the bottom portion of the glass container taken along a horizontal direction.

Further, when the method of manufacturing a glass container of the invention is performed, it is preferable that, in the step (C), the pressure of the air is set to a value within the range of 0.05 to 0.5 MPa and a total volume of air to be used is set to a value within the range of 1 to 100 ml.

Since the method of manufacturing a glass container of the invention is performed in this way, the reverse teardrop-shaped internal space can be more stably formed, a bubble independent of the outside can be more stably formed eventually, and the position and size of the bubble can be more accurately controlled.

Furthermore, when the method of manufacturing a glass container of the invention is performed, it is preferable that the maximum diameter of the bubble independent of the outside is set to a value within the range of 2 to 30 mm.

Since the method of manufacturing a glass container of the invention is performed in this way, a glass container, which has a unique design effect based on the bubble and is excellent in aesthetic appearance, can be more stably obtained.

BEST MODE(S) FOR CARRYING OUT THE INVENTION

An embodiment of the invention provides a method of manufacturing a glass container, which includes a mouth portion, a body portion, and a bottom portion, including the following steps (A) to (D).

A step (A) of molding a glass container, in which a bubble is not yet formed, from molten glass A step (B) of forming a bubble-forming passage by pulling out a needle-like member after inserting the needle-like member into a bottom portion of the glass container, in which a bubble is not yet formed, from a bottom face A step (C) of injecting air from an inlet of the bubble-forming passage to form a reverse teardrop-shaped internal space, which is widened in the bottom portion from the bubble-forming passage as a starting point, in the bottom portion of the glass container in which a bubble is not yet formed, and to obtain a glass container that includes an internal space formed in the bottom portion and communicating with the outside A step (D) of closing an inlet side of the reverse teardrop-shaped internal space of the glass container, which includes the internal space formed in the bottom portion and communicating with the outside, by flow of not yet cured glass, which is caused by the potential heat of the not yet cured glass, to obtain a glass container that includes a bubble formed in the bottom portion and independent of the outside An embodiment of the invention will be specifically described below appropriately with reference to the drawings.

1. Glass Container

A glass container, which is obtained from a method of manufacturing a glass container of the invention, will be described first.

(1) Shape

Figure 1A:
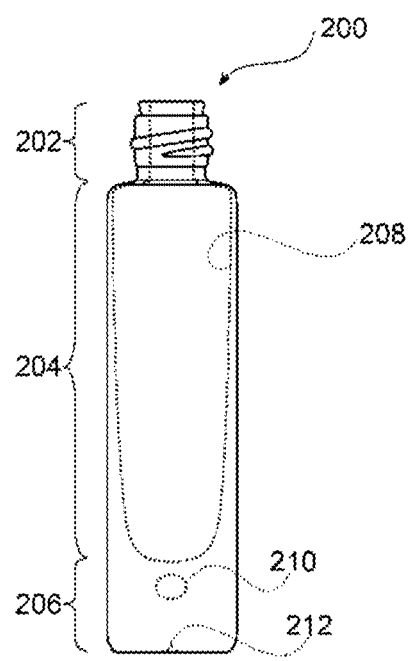
FIGS. 1(a) to 1(c) are diagrams illustrating a glass container that is obtained from a manufacturing method of the invention.
Figure 1B:
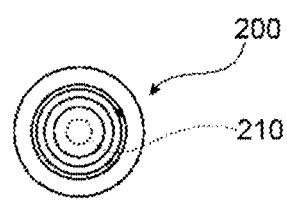
Figure 1C:
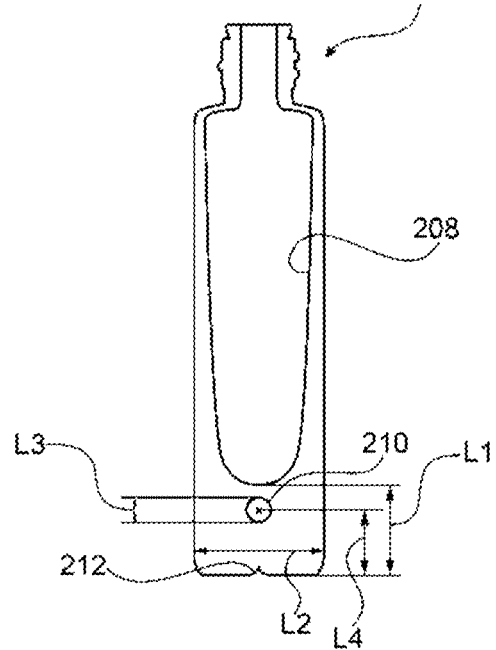

As illustrated in FIGS. 1(a) to 1(c), a glass container 200, which is obtained from the manufacturing method of the invention, includes a mouth portion 202, a body portion 204, and a bottom portion 206 and includes a bubble 210 that is formed in the bottom portion 206 and is independent of the outside.

The bubble 210 is isolated from the outside of the glass container 200 and is also isolated from a receiving portion 208 of the glass container 200.

Accordingly, the bubble 210 is an internal space that is enclosed by glass forming the bottom portion 206 and is filled with air.

Meanwhile, FIG. 1(a) is a front view of the glass container 200, FIG. 1(b) is a plan view of the glass container 200, and FIG. 1(c) is a cross-sectional view of the glass container 200 taken along a vertical direction.

Further, a portion, which is drawn by a broken line, of the glass container 200 illustrated in FIG. 1(a), indicates the internal structure of the glass container that is visually recognized as the appearance.

Furthermore, the appearance shape of the glass container 200 is not particularly limited. For example, the glass container may be a bottleneck type glass bottle illustrated in FIGS. 1(a) to 1(c), and may be a rectangular glass bottle, a cylindrical glass bottle, an irregular glass bottle, a rectangular glass box, a cylindrical glass box, an irregular glass box, and the like.

Moreover, it is preferable that the thickness L1 of the bottom portion 206 in a longitudinal direction is set to a value within the range of 20 to 100 mm.

The reason for this is that there is a case in which it is difficult to stably close the inlet of a reverse teardrop-shaped internal space by the flow of uncured glass, which uses reheating caused by the potential heat of uncured glass, since the weight and heat capacity of the bottom portion 206 are excessively small when L1 is set to a value smaller than 20 mm.

Meanwhile, the reason for this is that there is a case in which a yield is reduced due to the significant deformation of the glass container in a post-step since the weight and heat capacity of the bottom portion 206 are excessively large when L1 is set to a value exceeding 100 mm.

Accordingly, it is more preferable that the lower limit of the thickness L1 of the bottom portion 206 in the longitudinal direction is set to a value of 22 mm or more, and it is still more preferable that the lower limit of the thickness L1 is set to a value of 25 mm or more.

Further, it is more preferable that the upper limit of the thickness L1 of the bottom portion 206 in the longitudinal direction is set to a value of 50 mm or less, and it is still more preferable that the upper limit of the thickness L1 is set to a value of 30 mm or less.

For the same reason, it is preferable that the maximum diameter L2 of the bottom portion 206 is set to a value within the range of 30 to 80 mm.

Accordingly, it is more preferable that the lower limit of the maximum diameter L2 of the bottom portion 206 is set to a value of 35 mm or more, and it is still more preferable that the lower limit of the maximum diameter L2 is set to a value of 40 mm or more.

Further, it is more preferable that the upper limit of the maximum diameter L2 of the bottom portion 206 is set to a value of 70 mm or less, and it is still more preferable that the upper limit of the maximum diameter L2 is set to a value of 50 mm or less.

Furthermore, it is preferable that the maximum diameter L3 of the bubble 210 independent of the outside is set to a value within the range of 2 to 30 mm.

The reason for this is that there is a case in which it is difficult to sufficiently obtain a design effect caused by the bubble 210 when the maximum diameter L3 is set to a value smaller than 2 mm. Meanwhile, the reason for this is that there is a case in which it is difficult to stably make the bubble 210 be independent of the outside or to stably control the position of the bubble 210 when the maximum diameter L3 is set to a value of 30 mm or more.

Accordingly, it is more preferable that the lower limit of the maximum diameter L3 of the bubble 210 independent of the outside is set to a value of 4 mm or more, and it is still more preferable that the lower limit of the maximum diameter L3 is set to a value of 6 mm or more.

Further, it is more preferable that the upper limit of the maximum diameter L3 of the bubble 210 independent of the outside is set to a value of 20 mm or less, and it is still more preferable that the upper limit of the maximum diameter L3 is set to a value of 10 mm or less.

Furthermore, the shape of the bubble 210 independent of the outside is not particularly limited, but it is preferable that the shape of the bubble 210 is usually a spherical shape or an oval spherical shape.

Moreover, it is preferable that the number of bubbles 210 independent of the outside is usually 1, but the number of bubbles 210 may be 2 or more.

Meanwhile, the size and shape of the bubble 210 in the front view of the glass container 200 illustrated in FIG. 1($a$) are different from the size and shape of the bubble 210 in the cross-sectional view of the glass container 200 illustrated in FIG. 1($c$). However, the reason for this is that the size and shape of the bubble 210 illustrated in the front view of FIG. 1($a$) are changed in appearance due to the lens effect of glass present on the front side of the bubble 210.

Accordingly, the true size and true shape of the bubble 210 are recognized on the basis of the cross-sectional view of FIG. 1($c$).

Further, it is preferable that a distance L4 between the center of the bubble 210 independent of the outside and a bottom face is set to a value within the range of 20 to 80% of the thickness L1 of the bottom portion 206 in the longitudinal direction.

The reason for this is that there is a case in which it is difficult to stably form the reverse teardrop-shaped internal space in a step (C) and, eventually, to stably form the bubble 210 independent of the outside when a ratio of L4 to L1 is set to a value lower than 20%. Meanwhile, the reason for this is that there is a concern that the upper end portion of the reverse teardrop-shaped internal space may be ruptured toward the receiving portion since the upper end portion of the reverse teardrop-shaped internal space and the bottom face of the receiving portion are excessively close to each other in the step (C) and the bottom face of the receiving portion is likely to be deformed when the ratio of L4 to L1 is set to a value exceeding 80%.

Accordingly, it is more preferable that the lower limit of the ratio of L4 to L1 is set to a value of 30% or more, and it is still more preferable that the lower limit of the ratio of L4 to L1 is set to a value of 40% or more.

Further, it is more preferable that the upper limit of the ratio of L4 to L1 is set to a value of 70% or less, and it is still more preferable that the upper limit of the ratio of L4 to L1 is set to a value of 60% or less.

Furthermore, a dent 212, which faces the bubble 210 from the bottom face, is formed at one point on the bottom face of the glass container 200 illustrated in FIGS. 1($a$) and 1($c$), but the dent 212 is caused by the shape of a bottom mold used in the step (C).

Accordingly, a glass container 200 not including the dent 212 can be manufactured through the appropriate adjustment of the shape of the bottom mold.

(2) Material

Further, the type of glass forming the glass container 200 is not particularly limited, and examples of the glass forming the glass container 200 include soda-lime glass, borosilicate glass, lead glass, phosphate glass, aluminosilicate glass, and the like. However, it is preferable that soda-lime glass is used as the glass forming the glass container 200.

Furthermore, it is preferable that colorless transparent glass is used as the glass forming the glass container 200, but it is also preferable that colored transparent glass or colored translucent glass is used as the glass forming the glass container. When colorless transparent glass is used, the color of contents received in the glass container 200 can be sufficiently recognized from the outside and the bubble 210 independent of the outside, which is formed in the bottom portion 206, can be clearly and visually recognized. Accordingly, the designability caused by the bubble 210 can be effectively exhibited.

Meanwhile, when colored transparent glass or colored translucent glass is used, the presence of the bubble 210 can be emphasized by a color or shade. Accordingly, unique designability, which is different from designability obtained when colorless transparent glass is used, can be exhibited.

2. Respective Steps

The method of manufacturing a glass container of the invention is a method of manufacturing the glass container 200 illustrated in FIGS. 1($a$) to 1($c$), and includes predetermined steps (A) to (D).

Accordingly, after the respective steps will be described first with reference to FIGS. 2 to 6, an apparatus for manufacturing a glass container and the components thereof will be specifically described.

(1) Step (A)

The step (A) is a step of molding a glass container, in which a bubble is not yet formed, from molten glass.

Further, in the invention, a method of molding the glass container, in which a bubble is not yet formed, from molten glass is not particularly limited and a molding method, which has been publicly known in the past, can be used as the method of molding the glass container, in which a bubble is not yet formed, from molten glass.

That is, molding methods, such as a blow-and-blow molding method, a press-and-blow molding method, a one-press molding method, and a one-blow molding method, may be used, but a blow-and-blow molding method will be specifically described below by way of example.

In the case of a blow-and-blow molding method, the step (A) is a step of forming a parison 71 as a rough-shaped glass container from molten glass (gob 70) by using a rough mold 100 as illustrated in FIGS. 2(*a*) to 2(*c*) and molding a glass container 400, in which a bubble is not yet formed, by blow molding after moving the parison 71 to a finishing mold 300 as illustrated in FIGS. 3(*a*) to 3(*d*).

Specifically, first, as illustrated in FIG. 2(*a*), the rough mold 100 is placed and the gob 70 is put into the rough mold 100 through a funnel 72.

Next, after air is blown into the rough mold 100 through a baffle 60 and the funnel 72 to make the gob 70 be in contact with a plunger 50 disposed on the side of the rough mold 100 opposite to the side of the rough mold 100 to which the funnel 72 is fitted as illustrated in FIG. 2(*b*), the plunger 50 is separated from the gob 70 to form a recess on the surface of the gob 70.

Then, as illustrated in FIG. 2(*c*), counterblow air 91 for molding a parison is blown up from the tip portion of the plunger 50 to form the parison 71.

Meanwhile, FIGS. 2(*a*) to 2(*c*) are cross-sectional views when all components including the rough mold 100, the plunger 50, and the like are cut along a plane orthogonal to a two-dividing cross-section, at which the rough mold 100 is divided into two pieces and is opened, and a cutting surface is viewed from the front. A line D of FIGS. 2(*a*) and 2(*b*) is a dividing line when the rough mold 100 is divided into two pieces and is opened.

Then, as illustrated in FIGS. 3(*a*) to 3(*d*), the parison 71 is received in the finishing mold 300 as illustrated in FIG. 3(*b*) after being rotated an angle of 180° by a rotating device 80 including an arm 82.

After that, as illustrated in FIG. 3(*c*), final-blow air 92 is blown into the parison 71 from a blow head 90 to inflate the parison 71.

Accordingly, the outer peripheral surface of the parison 71 is pushed against the inner peripheral surface of the finishing mold 300 and the outer shape of a glass container is formed, so that a glass container 400 in which a bubble is not yet formed can be obtained as illustrated FIG. 3(*d*).

Meanwhile, FIGS. 3(*a*) to 3(*d*) are cross-sectional views when all components including the finishing mold 300, the parison 71, and the like are cut along a plane orthogonal to a two-dividing cross-section, at which the finishing mold 300 is divided into two pieces and is opened, and a cutting surface is viewed from the front.

Further, all glass materials used as the material of the glass container can be used, but it is preferable that the composition of usual soda-lime glass is used as the composition of the gob 70.

Furthermore, the weight of the gob 70 depends on a glass container to be manufactured, but it is preferable that the weight of the gob 70 is usually set to a value within the range of 200 to 300 g.

The reason for this is that there is a case in which it is difficult to stably form a bubble-forming passage or the reverse teardrop-shaped internal space or to stably close the inlet side of the reverse teardrop-shaped internal space since the flowability of uncured glass is excessively lowered in the steps (B) to (D) when the weight of the gob 70 is set to a value smaller than 200 g. Meanwhile, the reason for this is that there is a case in which it is difficult to stably form the bubble-forming passage or the reverse teardrop-shaped internal space or to stably close only the inlet side of the reverse teardrop-shaped internal space in the step (D) by the flow of uncured glass, which uses reheating caused by the potential heat of uncured glass, since the flowability of uncured glass is excessively increased in the steps (B) to (D) when the weight of the gob 70 is set to a value exceeding 300 g.

Accordingly, it is more preferable that the lower limit of the weight of the gob 70 is set to a value of 230 g or more, and it is still more preferable that the lower limit of the weight of the gob 70 is set to a value of 250 g or more.

Further, it is more preferable that the upper limit of the weight of the gob 70 is set to a value of 280 g or less, and it is still more preferable that the upper limit of the weight of the gob 70 is set to a value of 260 g or less.

Furthermore, it is preferable that the temperature of the gob 70 is usually set to a value within the range of 900 to 1300° C.

That is, the reason for this is that there is a case in which it is difficult to stably form the bubble-forming passage or the reverse teardrop-shaped internal space or to stably close the inlet side of the reverse teardrop-shaped internal space since the flowability of uncured glass is excessively lowered in the steps (B) to (D) when the temperature of the gob 70 is set to a value lower than 900° C. Meanwhile, the reason for this is that there is a case in which it is difficult to stably form the bubble-forming passage or the reverse teardrop-shaped internal space or to stably close only the inlet side of the reverse teardrop-shaped internal space by the flow of uncured glass, which uses reheating caused by the potential heat of uncured glass, since the flowability of uncured glass is excessively increased in the steps (B) to (D) when the temperature of the gob 70 is set to a value exceeding 1300° C.

Accordingly, it is more preferable that the lower limit of the temperature of the gob 70 is set to a value of 1000° C. or more, and it is still more preferable that the lower limit of the temperature of the gob 70 is set to a value of 1100° C. or more.

Further, it is more preferable that the upper limit of the temperature of the gob 70 is set to a value of 1250° C. or less, and it is still more preferable that the upper limit of the temperature of the gob 70 is set to a value of 1200° C. or less.

(2) Step (B)

The step (B) is a step of forming an air passage, which forms a bubble, (bubble-forming passage) 410 by pulling out a needle-like member 310 after inserting the needle-like member 310 into the bottom portion of the glass container 400, which is molded in the step (C) and in which a bubble is not yet formed, from the bottom face as illustrated in FIGS. 4(*a*) and 4(*b*).

Specifically, as illustrated in FIG. 4(*a*), the needle-like member 310, which is received in a bottom mold 302 so as to be movable up and down, is moved up to be inserted into the bottom portion of the glass container 400, in which a bubble is not yet formed, from the bottom face.

Then, the needle-like member 310 is moved down and pulled out as illustrated in FIG. 4(*b*), so that the bubble-forming passage 410 corresponding to the shape of the needle-like member 310 is formed in the bottom portion of the glass container 400 in which a bubble is not yet formed.

Meanwhile, FIGS. 4(*a*) and 4(*b*) are cross-sectional views when all components including the finishing mold 300, the glass container 400 in which a bubble is not yet formed, and the like are cut along a plane orthogonal to a two-dividing plane, at which the finishing mold 300 is divided into two pieces and is opened, and a cutting surface is viewed from the front.

Further, it is preferable that a time, which is to elapse until the needle-like member 310 starts to be inserted, is set to a value within the range of 0.01 to 0.5 sec immediately after the completion of the step (A).

The reason for this is that there is a case in which it is difficult to control the time, which is to elapse until the needle-like member 310 starts to be inserted, since the time is too strict when the time is set to a value smaller than 0.01 sec immediately after the completion of the step (A). Meanwhile, the reason for this is that there is a case in which it is difficult to stably form the bubble-forming passage or the reverse teardrop-shaped internal space or to stably close the inlet side of the reverse teardrop-shaped internal space since the amount of the potential heat of uncured glass is excessively reduced when the time is set to a value exceeding 0.5 sec immediately after the completion of the step (A).

Accordingly, it is more preferable that the lower limit of the time, which is to elapse until the needle-like member 310 starts to be inserted, is set to 0.05 sec or more immediately after the completion of the step (A), and it is still more preferable that the lower limit of the time, which is to elapse until the needle-like member 310 starts to be inserted, is set to 0.1 sec or more immediately after the completion of the step (A).

Further, it is more preferable that the upper limit of the time, which is to elapse until the needle-like member 310 starts to be inserted, is set to 0.3 sec or less immediately after the completion of the step (A), and it is still more preferable that the upper limit of the time, which is to elapse until the needle-like member 310 starts to be inserted, is set to 0.2 sec or less immediately after the completion of the step (A).

Furthermore, it is preferable that a time, which is to elapse until the needle-like member 310 starts to be pulled out, is set to a value within the range of 0.05 to 0.5 sec immediately after the completion of the insertion of the needle-like member 310.

The reason for this is that there is a case in which it is difficult to stably form the bubble-forming passage and, eventually, to stably form the bubble independent of the outside since a passage, which is formed immediately after the needle-like member 310 is pulled out, is buried when the time, which is to elapse until the needle-like member 310 starts to be pulled out, is set to be shorter than 0.05 sec immediately after the completion of the insertion of the needle-like member 310. Meanwhile, the reason for this is that there is a case in which the deformation or alteration of the needle-like member 310 is likely to be caused by a thermal load since a time during which the needle-like member 310 is in contact with high-temperature uncured glass is lengthened when the time, which is to elapse until the needle-like member 310 starts to be pulled out, is set to exceed 0.5 sec immediately after the completion of the insertion of the needle-like member 310.

Accordingly, it is more preferable that the lower limit of the time, which is to elapse until the needle-like member 310 starts to be pulled out, is set to 0.05 sec or more immediately after the completion of the insertion of the needle-like member 310, and it is still more preferable that the lower limit of the time, which is to elapse until the needle-like member 310 starts to be pulled out, is set to 0.1 sec or more immediately after the completion of the insertion of the needle-like member 310.

Further, it is more preferable that the upper limit of the time, which is to elapse until the needle-like member 310 starts to be pulled out, is set to 0.3 sec or less immediately after the completion of the insertion of the needle-like member 310, and it is still more preferable that the upper limit of the time, which is to elapse until the needle-like member 310 starts to be pulled out, is set to 0.2 sec or less immediately after the completion of the insertion of the needle-like member 310.

Furthermore, it is preferable that the depth L5 of the bubble-forming passage 410 from the bottom face, which is obtained immediately after the needle-like member 310 is pulled out, is set to a value within the range of 20 to 80% of the thickness L1 of the bottom portion as illustrated in FIG. 4(*c*).

The reason for this is that there is a case in which it is difficult to stably form the reverse teardrop-shaped internal space in the step (C) and, eventually, to stably form the bubble independent of the outside when a ratio of L5 to L1 is set to a value lower than 20%. Meanwhile, the reason for this is that there is a concern that the upper end portion of the reverse teardrop-shaped internal space may be ruptured toward the receiving portion due to the easy deformation of the bottom face of the receiving portion since the upper end portion of the reverse teardrop-shaped internal space and the bottom face of the receiving portion are excessively close to each other in the step (C) and the bottom face of the receiving portion is likely to be deformed when the ratio of L5 to L1 is set to a value exceeding 80%.

Accordingly, it is more preferable that the lower limit of the ratio of L5 to L1 is set to a value of 30% or more, and it is still more preferable that the lower limit of the ratio of L5 to L1 is set to a value of 40% or more.

Further, it is more preferable that the upper limit of the ratio of L5 to L1 is set to a value of 70% or less, and it is still more preferable that the upper limit of the ratio of L5 to L1 is set to a value of 60% or less.

Here, a relationship between the ratio of L5 to L1 and the reverse teardrop-shaped internal space, which is formed in the next step (C), will be described.

That is, since uncured glass positioned near the bottom face of the glass container 400 in which a bubble is not yet formed is cooled by the bottom mold 302 in the steps (B) and (C), the flowability of the uncured glass is lowered in comparison with that of uncured glass positioned above the uncured glass.

For this reason, if the bubble-forming passage 410 does not extend in the step (B) beyond an uncured glass area, which is positioned near the bottom face and in which flowability is relatively low, up to an uncured glass area which is positioned above the uncured glass area and in which flowability is relatively high, it is difficult to stably form the reverse teardrop-shaped internal space in the next step (C).

More specifically, as illustrated in FIGS. 5(*a*) and 5(*b*), the bubble-forming passage 410 is little inflated in the uncured glass area, which is positioned near the bottom face and in which flowability is relatively low, even though air is injected. On the other hand, since flowability is relatively high in the uncured glass area that is positioned above the uncured glass area, the bubble-forming passage 410 is sufficiently inflated by the injection of air. As a result, a reverse teardrop-shaped internal space 510 is stably formed.

That is, the reverse teardrop-shaped internal space 510, which is formed in the step (C), is an internal space that is formed through the good use of the temperature distribution of the bottom portion of the glass container 400 in which a bubble is not yet formed.

Figure 4A:
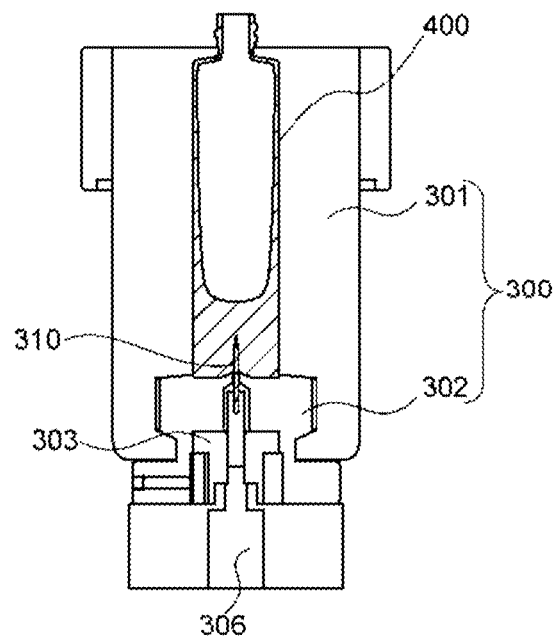
FIGS. 4(a) to 4(c) are diagrams illustrating a step (B) of the method of manufacturing a glass container of the invention.
Figure 4B:
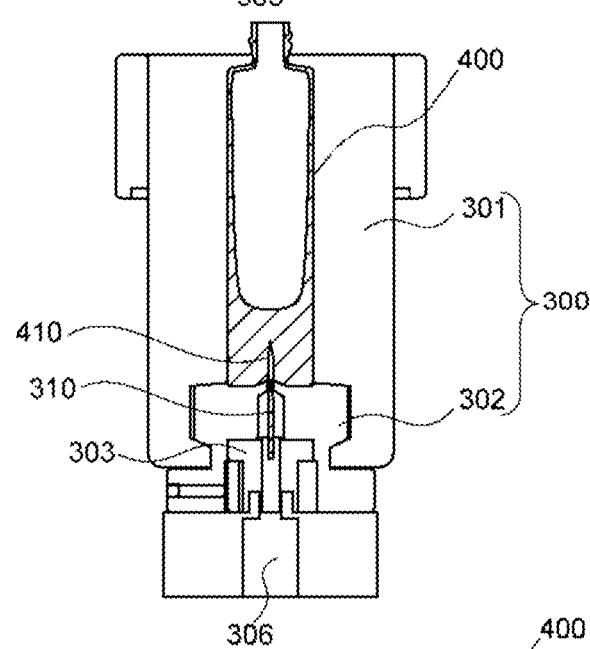
Figure 4C:
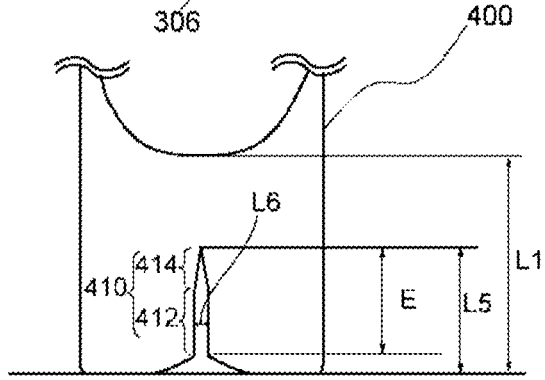

Further, it is preferable that the maximum diameter L6 of the bubble-forming passage 410, which is formed immediately after the needle-like member 310 is pulled out as illustrated in FIG. 4(c), is set to a value within the range of 0.5 to 5 mm.

The reason for this is that there is a case in which the bubble-forming passage 410 is closed by the flow of uncured glass, which is caused by the potential heat of uncured glass, before the injection of air in the step (C) when the maximum diameter L6 is set to a value smaller than 0.5 mm. Meanwhile, the reason for this is that there is a case in which it is difficult to stably close the inlet side of the reverse teardrop-shaped internal space by the flow of uncured glass, which is caused by the potential heat of uncured glass, in the step (D) since the inlet side of the reverse teardrop-shaped internal space is excessively widened in the step (C) when the maximum diameter L6 is set to a value exceeding 5 mm.

Accordingly, it is more preferable that the lower limit of the maximum diameter L6 of the bubble-forming passage 410, which is formed immediately after the needle-like member 310 is pulled out, is set to a value of 1 mm or more, and it is still more preferable that the lower limit of the maximum diameter L6 is set to a value of 1.5 mm or more.

Further, it is more preferable that the upper limit of the maximum diameter L6 of the bubble-forming passage 410, which is formed immediately after the needle-like member 310 is pulled out, is set to a value of 3 mm or less, and it is still more preferable that the upper limit of the maximum diameter L6 is set to a value of 2.5 mm or less.

Meanwhile, FIG. 4(c) is a cross-sectional view of the bottom portion of the glass container 400, in which the bubble-forming passage 410 is formed and a bubble is not yet formed, taken along the vertical direction.

Further, the shape of the bubble-forming passage 410, which is formed immediately after the needle-like member 310 is pulled out, is substantially the same as the shape of the needle-like member 310 that is inserted into the bottom portion of the glass container 400 in which a bubble is not yet formed.

Accordingly, the bubble-forming passage 410 usually has a shape in which the maximum diameter of a passage portion 412 is constant and the maximum diameter of a tip portion 414 is reduced toward the tip as shown in FIG. 4(c), but the maximum diameter L6 of the bubble-forming passage 410 of the invention means the maximum diameter of the passage portion 412 of which the maximum diameter is constant.

Further, the shape of the cross-section of the bubble-forming passage 410, which is formed immediately after the needle-like member 310 is pulled out, taken along a plane orthogonal to the axis of the bubble-forming passage 410 is at least one selected from the group consisting of a circular shape, an oval shape, and a polygonal shape.

The reason for this is that, when these shapes are selected, the reverse teardrop-shaped internal space may be more reliably formed in the step (C) by the injection of air into the bubble-forming passage 410 and the inlet side of the bubble-forming passage 410 may be more stably closed by the flow of uncured glass that uses reheating caused by the potential heat of uncured glass.

Further, it is preferable that an insertion direction, in which the needle-like member 310 is inserted from the bottom face of the glass container 400 in which a bubble is not yet formed, is set to correspond to the upper side in the vertical direction.

The reason for this is that the bubble-forming passage may be deformed so as to be symmetric with respect to the vertical direction by the injection of air in the step (C) since the bubble-forming passage is formed in the vertical direction when the insertion direction is set to correspond to the upper side in the vertical direction.

That is, the reason for this is that the reverse teardrop-shaped internal space may be stably formed, the bubble independent of the outside may be more stably formed eventually, and the position and size of the bubble may be more accurately controlled.

(3) Step (C)

Figure 5A:
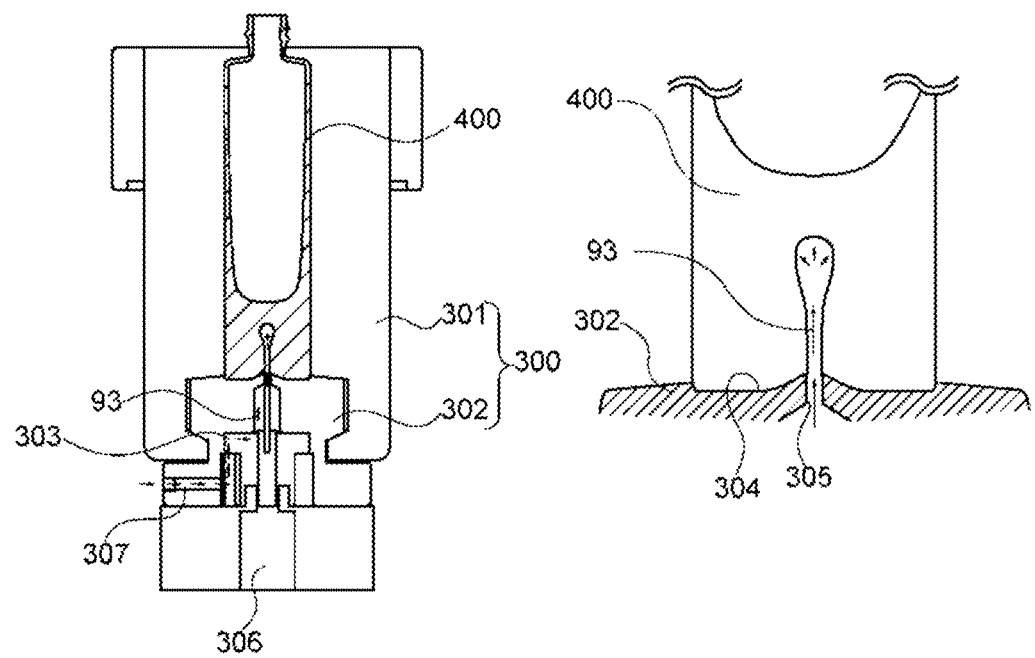
FIGS. 5(a) and 5(b) are diagrams illustrating a step (C) of the method of manufacturing a glass container of the invention.
Figure 5B:
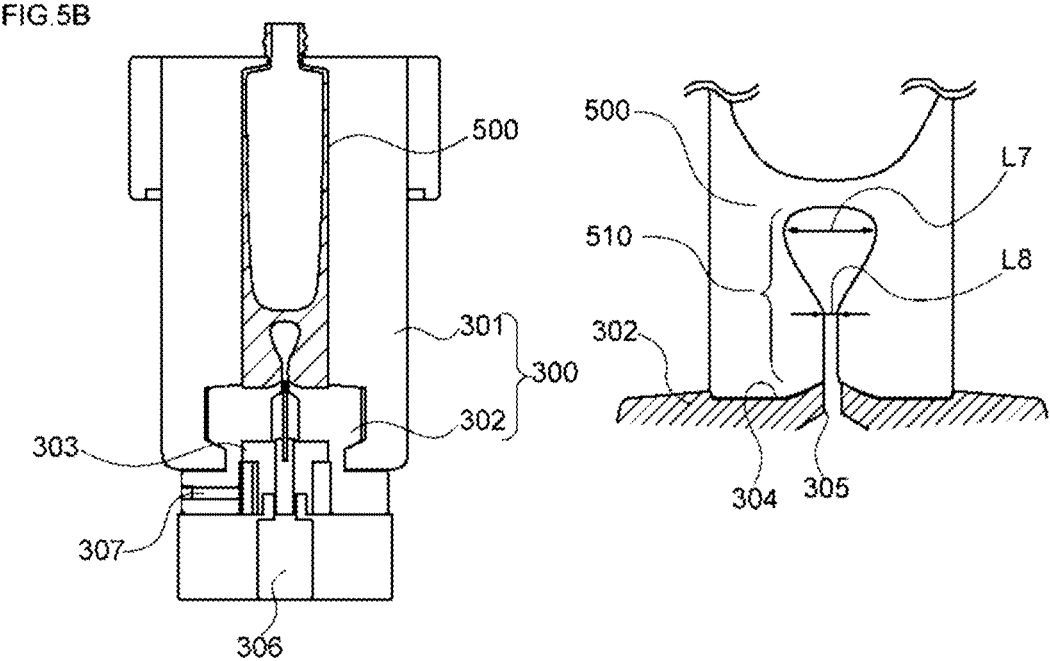

The step (C) is a step of injecting air 93 from the inlet of the bubble-forming passage 410 to form the reverse teardrop-shaped internal space 510, which is widened in the bottom portion from the bubble-forming passage 410 as a starting point, in the bottom portion of the glass container 400 in which a bubble is not yet formed and to obtain a glass container 500, which includes an internal space formed in the bottom portion and communicating with the outside, as illustrated in FIGS. 5(a) and 5(b).

Specifically, air 93 is blown into the bubble-forming passage 410 formed immediately after the needle-like member 310 is pulled out as illustrated in FIG. 5(a). Accordingly, the tip portion of the bubble-forming passage 410 is sufficiently inflated during the suppression of the inflation of the inlet side of the bubble-forming passage 410 through the use of the temperature distribution of the bottom portion of the glass container 400 in which a bubble is not yet formed. As a result, the reverse teardrop-shaped internal space 510 is formed as illustrated in FIG. 5(b).

More specifically, the tip portion 414 of the bubble-forming passage 410 is inflated around a direction in which the bubble-forming passage 410 is formed by the injection of air, so that the internal space is formed.

On the other hand, since the temperature of a portion positioned near the bottom face of the receiving portion and the temperature of a portion, which is positioned near the surface of the glass container and is in contact with a mold, are relatively low, the flowability of glass is low at the portions.

For this reason, since the flowability of glass is lower at a position closer to the bottom face of the receiving portion when the internal space, which is inflated by the injection of air, is inflated up to a position near the bottom face of the receiving portion, the internal space is inflated in a lateral direction where the flowability of glass is relatively high.

As a result, the internal space having the shape of Erlenmeyer flask, which is inverted, (the shape of inverted Erlenmeyer flask) is formed as illustrated in FIG. 5(b).

Meanwhile, the shape of inverted Erlenmeyer flask is the typical shape of a reverse teardrop shape that is essential in the invention.

Further, it is preferable that the maximum diameter L7 of the reverse teardrop-shaped internal space 510 in a horizontal direction is set to a value within the range of 2 to 50 mm.

The reason for this is that it is difficult to stably form the reverse teardrop-shaped internal space and, eventually, to stably control the position of a bubble independent of the outside when the maximum diameter L7 is set to a value smaller than 2 mm. Meanwhile, the reason for this is that there is a concern that the shape of a bubble may vary since glass is cured before the reverse teardrop-shaped internal space is sufficiently deformed in the post-step due to the surface tension when the maximum diameter L7 is set to a value exceeding 50 mm.

Accordingly, it is more preferable that the lower limit of the maximum diameter L7 of the reverse teardrop-shaped internal space 510 in the horizontal direction is set to 5 mm or more, and it is still more preferable that the lower limit of the maximum diameter L7 is set to 8 mm or more.

Further, it is more preferable that the upper limit of the maximum diameter L7 of the reverse teardrop-shaped internal space 510 in the horizontal direction is set to a value of 30 mm or less, and it is still more preferable that the upper limit of the maximum diameter L7 is set to a value of 14 mm or more.

Furthermore, it is preferable that the minimum diameter L8 of the reverse teardrop-shaped internal space 510 in the horizontal direction is set to a value within the range of 0.5 to 5 mm.

The reason for this is that there is a concern that the bubble independent of the outside may be reduced in size since it is difficult to inject air and to make the maximum diameter L7 be a sufficient size when the minimum diameter L8 is set to a value smaller than 0.5 mm. Meanwhile, the reason for this is that it is difficult to close the inlet portion of the reverse teardrop-shaped internal space 510 in the step (D) by the flow of uncured glass, which is caused by the potential heat of uncured glass, and, eventually, to stably control the position of a bubble independent of the outside when the minimum diameter L8 is set to a value exceeding 5 mm.

Accordingly, it is more preferable that the lower limit of the minimum diameter L8 of the reverse teardrop-shaped internal space 510 in the horizontal direction is set to 1 mm or more, and it is still more preferable that the lower limit of the minimum diameter L8 is set to 1.5 mm or more.

Further, it is more preferable that the upper limit of the minimum diameter L8 of the reverse teardrop-shaped internal space 510 in the horizontal direction is set to 3 mm or less, and it is still more preferable that the upper limit of the minimum diameter L8 is set to 2.2 mm or less.

Furthermore, it is preferable that the pressure of air to be injected into the bubble-forming passage 410 is set to a value within the range of 0.05 to 0.5 MPa.

The reason for this is that there is a case in which it is difficult to stably form the reverse teardrop-shaped internal space 510 since it is difficult to sufficiently inflate the tip portion of the bubble-forming passage 410 when the pressure of air is set to a value lower than 0.05 MPa. Meanwhile, the reason for this is that there is a case in which it is difficult to stably close the inlet side of the reverse teardrop-shaped internal space 510 by the flow of uncured glass, which uses reheating caused by the potential heat of uncured glass, in the next step (D) since the inlet side of the bubble-forming passage 410 is excessively inflated when the pressure of air is set to a value exceeding 0.5 MPa.

Accordingly, it is more preferable that the lower limit of the pressure of air to be injected into the bubble-forming passage 410 is set to a value of 0.1 MPa or more, and it is still more preferable that the lower limit of the pressure of air to be injected into the bubble-forming passage 410 is set to a value of 0.15 MPa or more.

Further, it is more preferable that the upper limit of the pressure of air to be injected into the bubble-forming passage 410 is set to a value of 0.4 MPa or less, and it is still more preferable that the upper limit of the pressure of air to be injected into the bubble-forming passage 410 is set to a value of 0.3 MPa or less.

Furthermore, it is preferable that a total volume of air to be used for a single injection of air into the bubble-forming passage 410 is set to a value within the range of 1 to 100 ml (milliliter).

The reason for this is that there is a case in which it is difficult to stably form the reverse teardrop-shaped internal space 510 since it is difficult to sufficiently inflate the tip portion of the bubble-forming passage 410 when a total volume of air to be used for a single injection of air is set to a value smaller than 1 ml. Meanwhile, the reason for this is that there is a concern that the bubble-forming passage 410 is likely to be ruptured toward the receiving portion since the bubble-forming passage 410 is excessively inflated when a total volume of air to be used for a single injection of air is set to a value exceeding 100 ml.

Further, the reason for this is that there is a case in which it is difficult to stably close the inlet side of the reverse teardrop-shaped internal space 510 by the flow of uncured glass, which uses reheating caused by the potential heat of uncured glass, in the next step (D).

Accordingly, it is more preferable that the lower limit of the volume of air to be injected into the bubble-forming passage 410 is set to a value of 5 ml or more, and it is still more preferable that the lower limit of the volume of air to be injected into the bubble-forming passage 410 is set to a value of 20 ml or more.

Further, it is more preferable that the upper limit of the volume of air to be injected into the bubble-forming passage 410 is set to a value of 50 ml or less, and it is still more preferable that the upper limit of the volume of air to be injected into the bubble-forming passage 410 is set to a value of 30 ml or less.

(4) Step (D)

Figure 6A:
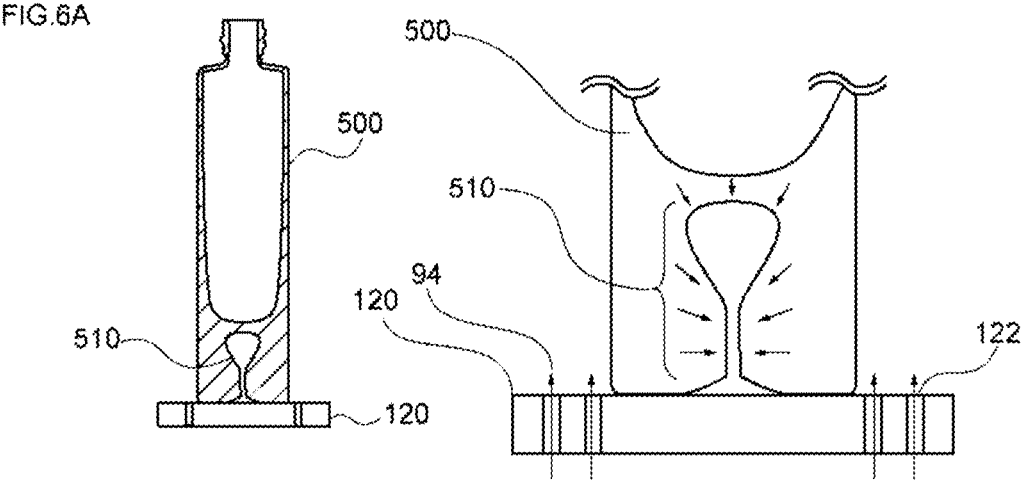
FIGS. 6(a) to 6(c) are diagrams illustrating a step (D) of the method of manufacturing a glass container of the invention.
Figure 6B:
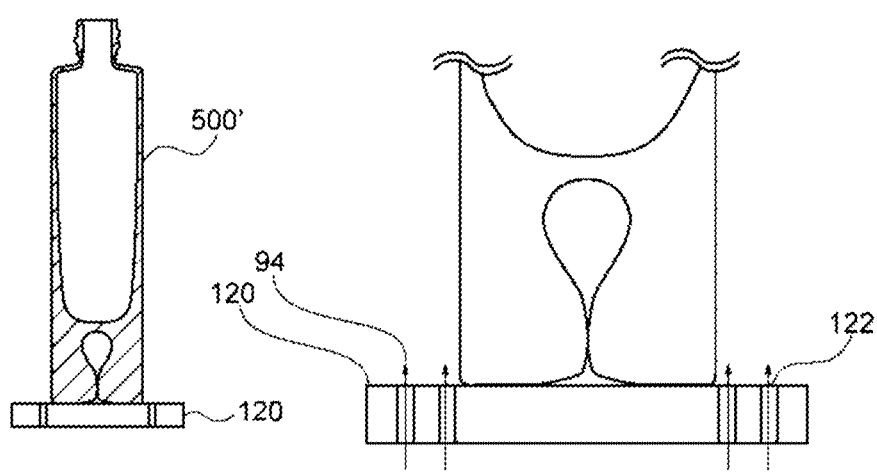
Figure 6C:
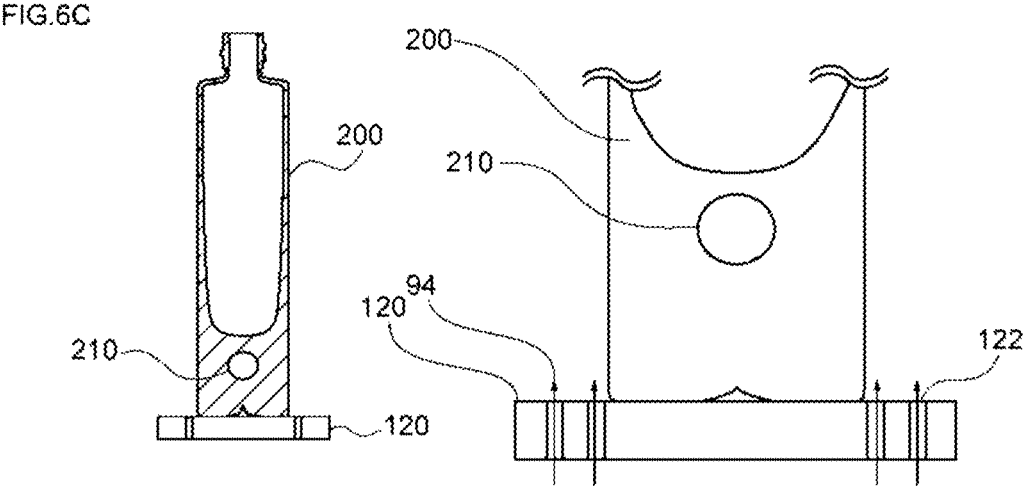

The step (D) is a step of taking the glass container 500, which includes the internal space formed in the bottom portion and communicating with the outside, out of the finishing mold 300 and then closing the inlet side of the reverse teardrop-shaped internal space 510 by the flow of uncured glass, which is caused by the potential heat of uncured glass, to obtain the glass container 200, which includes a bubble formed in the bottom portion and independent of the outside, as illustrated in FIGS. 6(a) to 6(c).

Specifically, the inlet side of the reverse teardrop-shaped internal space 510 formed in the step (C) is closed using the phenomenon of the flow of uncured glass using reheating caused by the potential heat of uncured glass, so that the bubble 210 independent of the outside is formed in the bottom portion as illustrated in FIGS. 6(a) to 6(c).

Further, the step (D) automatically starts immediately after the glass container 500, which includes the internal space formed in the bottom portion and communicating with the outside, is obtained in the step (C). Then, the step (D) is continued until the independent bubble is finally stabilized during a period in which the glass container 500, which includes the internal space formed in the bottom portion and communicating with the outside, is taken out of the finishing mold by a take-out device and is carried to and placed on a dead plate 120.

Accordingly, in terms of inhibiting the progress of the step (D) on the dead plate 120, it is preferable that blowing holes 122 for cooling air 94 are not provided at a portion of the dead plate 120 on which the glass container 500, which includes the internal space formed in the bottom portion and communicating with the outside, is placed as illustrated in FIGS. 6(a) to 6(c) and only the outer peripheral surface of the glass container 500, which includes the internal space formed in the bottom portion and communicating with the outside, is cooled.

Meanwhile, FIGS. 6(a) and 6(b) are cross-sectional views of the glass container 500, which includes the internal space formed in the bottom portion and communicating with the outside and is placed on the dead plate 120, taken along the vertical direction, and FIG. 6(c) is a cross-sectional view of the glass container 200, which includes a bubble formed in the bottom portion and independent of the outside and is placed on the dead plate 120, taken along the vertical direction.

Further, the dead plate 120 is a plate-like member that is used at a place where the glass container 500 is placed to be cooled.

More specifically, the dead plate 120 is a plate-like member including a cooling mechanism, such as blowing holes for cooling air, and is excellent in heat resistance and heat dissipation. Accordingly, it is more preferable that the dead plate 120 is formed of a flat plate made of a material, such as metal or carbon, and having a thickness of 5 to 7 mm.

3. Apparatus for Manufacturing Glass Container

Figure 7:
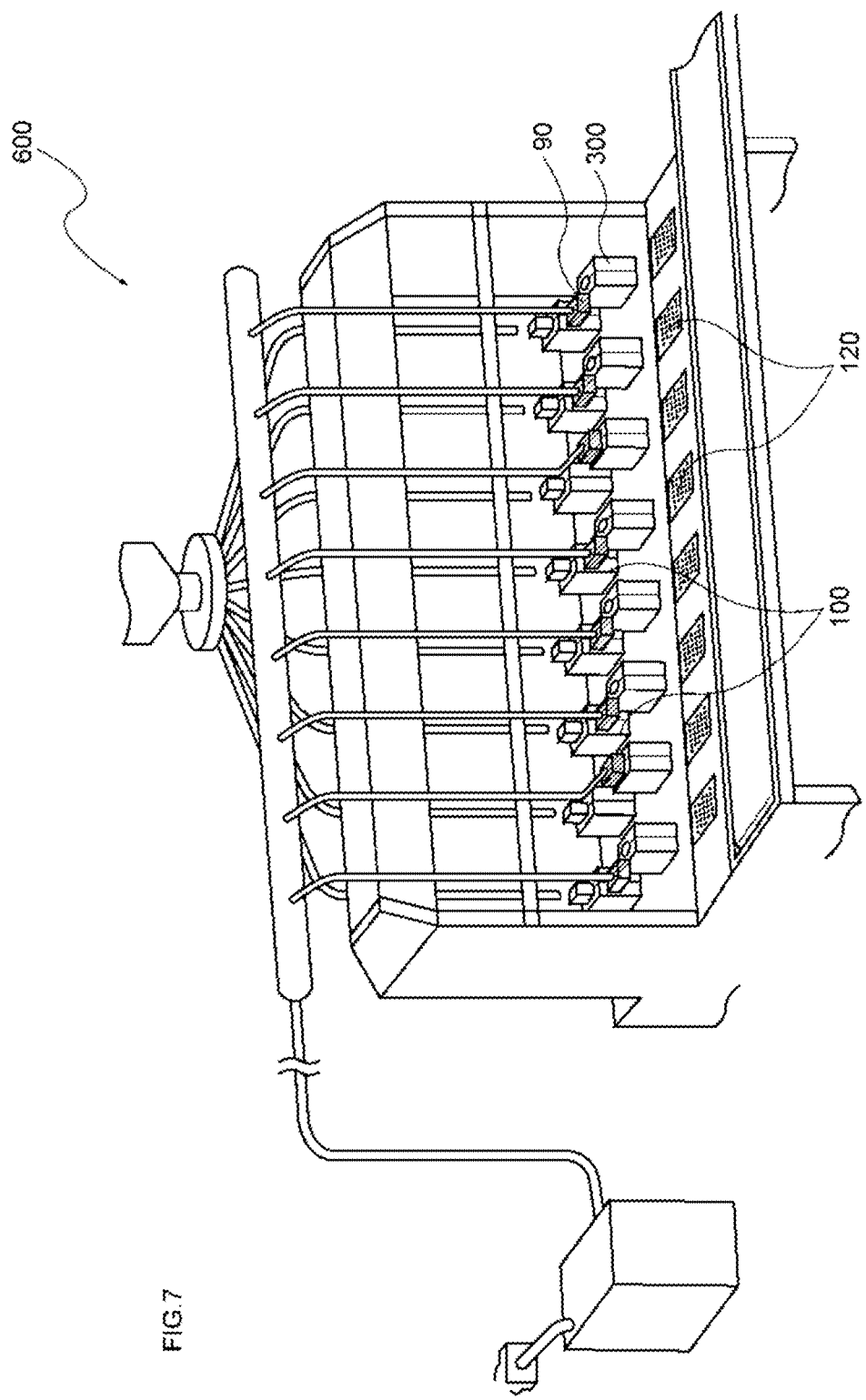
FIG. 7 is a diagram illustrating an apparatus for manufacturing the glass container.

As illustrated in FIG. 7, an individual section machine (IS machine) 600 can be used as a manufacturing apparatus that performs the method of manufacturing a glass container of the invention.

That is, the IS machine 600 can manufacture a glass container by using molding methods, such as a blow-and-blow molding method, a press-and-blow molding method, a one-press molding method, and a one-blow molding method.

For example, a case in which a blow-and-blow molding method is performed will be described by way of example. The IS machine 600 can mold a parison by using a predetermined rough mold 100 and then transfer the parison to the finishing mold 300, form a glass container having a finished shape, carry the glass container out of the finishing mold by the take-out device, and transfer the glass container onto the dead plate 120.

Accordingly, since the IS machine 600 uses a predetermined bottom mold, which includes the needle-like member movable up and down, as the bottom mold that forms the finishing mold 300, the IS machine 600 can stably manufacture the glass container 200 that is illustrated in FIGS. 1(a) to 1(c) and includes the internal space (bubble) formed in the bottom portion and not communicating with the outside.

Meanwhile, FIG. 7 is a perspective view of the IS machine 600.

Components of the IS machine 600 will be specifically described below using a case, in which a blow-and-blow molding method is performed, as an example.

(1) Rough Mold

Figure 2A:
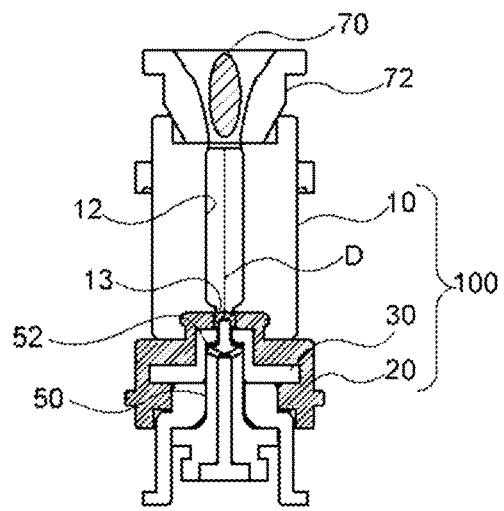
FIGS. 2(a) to 2(c) are diagrams illustrating a step (A) of the method of manufacturing a glass container of the invention.
Figure 2B:
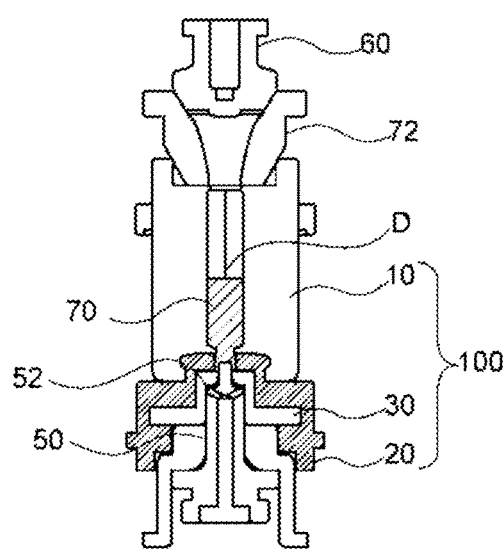
Figure 2C:
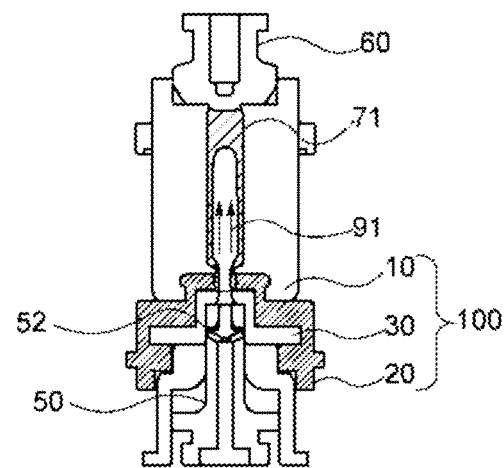
Figure 3A:
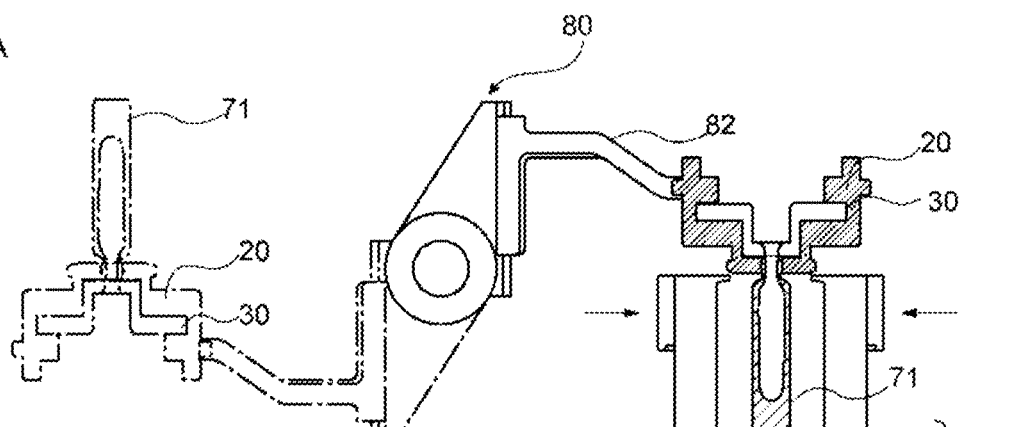
FIGS. 3(a) to 3(d) are diagrams illustrating the step (A) of the method of manufacturing a glass container of the invention.
Figure 3B:
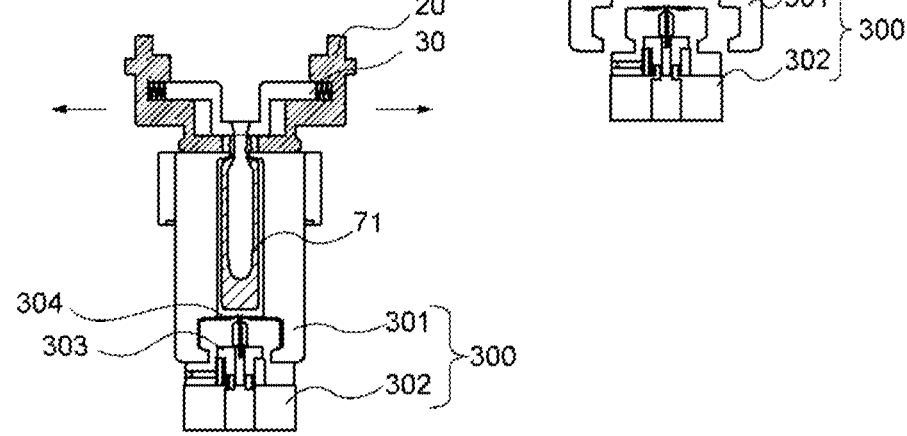
Figure 3C:
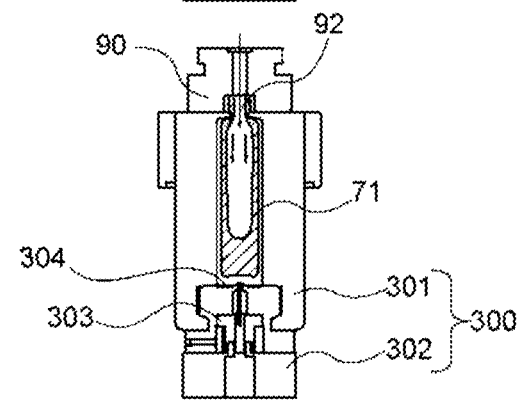
Figure 3D:
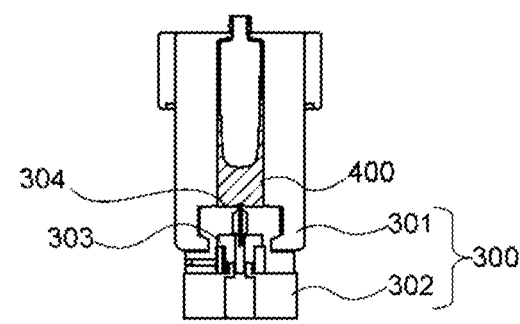

It is preferable that the rough mold 100 includes a rough mold base part 10 and a mouth mold 20 each of which is divided into two pieces and a guide ring 30 which is received in the mouth mold 20 so as to be slidable on a contact surface between itself and the mouth mold 20 during the opening/closing of the mouth mold 20 as illustrated in FIGS. 2(a) to 2(c).

(1)-1 Rough Mold Base Part

Further, the rough mold base part 10 is a mold member for forming the outer peripheral shape of the parison 71.

The rough mold base part 10 includes a molding portion 12 that includes a dividing line D at which the molding portion 12 is divided into two pieces and is opened and which is formed of an inner peripheral surface for forming the outer peripheral shape of the parison 71.

Furthermore, the rough mold base part 10 includes an opening portion which is provided above the molding portion 12 and through which a gob 70 is put, and the opening portion is provided with a recess in which the funnel 72 and the baffle 60 are mounted.

Moreover, the rough mold base part 10 also includes an opening portion which is provided below the molding portion 12 and is used to integrate the upper portion of the mouth mold by pinching the upper portion of the mouth mold 20 from both sides.

(1)-2 Mouth Mold

Further, the mouth mold 20 is a mold member for forming the outer peripheral shape of the mouth portion of the glass container.

The mouth mold 20 includes a mouth portion-molding portion 13 that includes a dividing line D at which the mouth portion-molding portion 13 is divided into two pieces and is opened and which is formed on the inner wall of an opening portion of the upper surface and is formed of an inner peripheral surface for forming the outer peripheral shape of the mouth portion of the glass container. When the mouth portion is adapted to be screwed to a cap member, the mouth portion-molding portion 13 is provided with grooves that are used to mold threads.

(1)-3 Guide Ring

Further, the guide ring 30 is a mold member for molding the upper end face the upper end face of the mouth portion, and is also a member for improving accuracy, when the plunger 50 is moved relative to the gob 70 to form a recess on the surface of the gob 70, and preventing counterblow air, which is blown from the plunger 50, from leaking to the lower side of the side opposite to the gob 70.

(2) Plunger

The plunger 50 is a member of which a tip portion is inserted into the rough mold 100 from the lower side of the rough mold 100 and which forms a recess on the surface of the gob 70 pressed down by a settle blow as illustrated in FIGS. 2(a) to 2(c).

Further, the plunger is also a member for blowing air from blowing holes 52 thereof and blowing (counter blowing) air into the gob from the above-mentioned recess as a starting point.

(3) Funnel

The funnel 72 is a member that is fitted to the upper opening portion of the rough mold base part 10 and is used to stably put the gob 70 into the rough mold 100 as illustrated in FIGS. 2(a) and 2(b).

(4) Baffle

As illustrated in FIG. 2(c), the baffle 60 is a member that is fitted to the upper opening portion of the rough mold base part 10 to close the opening portion, and is a mold member for molding the bottom face of the parison 71.

(5) Finishing Mold

It is preferable that the finishing mold 300 includes a finishing mold base part 301 divided into two pieces and a bottom mold 302 as illustrated in FIGS. 3(a) to 3(d).

(5)-1 Finishing Mold Base Part

The finishing mold base part 301 is a mold member for forming the outer peripheral shape of the glass container 400 in which a bubble is not yet formed as illustrated in FIGS. 3(a) to 3(d).

The finishing mold base part 301 includes a molding portion that includes a dividing line at which the molding portion is divided into two pieces and is opened and which is formed of an inner peripheral surface for forming the outer peripheral shape of the glass container 400 in which a bubble is not yet formed.

Further, the finishing mold base part 301 includes an opening portion which is provided above the molding portion and through which the mouth portion of the glass container 400 in which a bubble is not yet formed is exposed to the outside.

Furthermore, the finishing mold base part 301 also includes an opening portion which is provided below the molding portion and is used to integrate the upper portion of the bottom mold 302 by pinching the upper portion of the bottom mold 302 from both sides.

(5)-2 Bottom Mold

The bottom mold 302 is a mold member for molding the bottom face of the glass container 400 in which a bubble is not yet formed as illustrated in FIGS. 3(*a*) to 3(*d*), is also a member for forming the bubble-forming passage 410 as illustrated in FIGS. 4(*a*) and 4(*b*), and is also a member for forming the reverse teardrop-shaped internal space 510 as illustrated in FIGS. 5(*a*) and 5(*b*).

The bottom mold 302 includes a bottom face-molding portion 304 that is formed on the upper surface of the bottom mold 302 and molds the bottom face of the glass container 400 in which a bubble is not yet formed. An opening portion 305, which communicates with an internal space 303 of the bottom mold 302, is provided at the central portion of the bottom face-molding portion 304.

Further, as illustrated in FIGS. 4(*a*) and 4(*b*), a needle-like member 310 is received in the internal space 303 of the bottom mold 302 and is adapted to be capable of reciprocating between the internal space 303 of the bottom mold 302 and an upper space of the bottom mold 302 through the opening portion 305.

Furthermore, a drive device 306, which moves the needle-like member 310 up and down, is received below the internal space 303. The drive device 306 is not particularly limited, and publicly known systems, such as a pneumatic system, an electrical system, and a hydraulic system, can be employed as the drive device 306. However, it is specifically preferable that a pneumatic cylinder is used as the drive device 306.

In addition, since the internal space 303 of the bottom mold 302 communicates with an air supply passage 307 as illustrated in FIGS. 5(*a*) and 5(*b*), air, which is supplied to the bottom mold 302 through the air supply passage 307, is blown from the opening portion 305 through the internal space 303 and is injected into the bubble-forming passage 410 formed by the needle-like member 310.

The needle-like member 310, which is a characteristic component of the invention, will be specifically described below.

As long as the tip of the needle-like member 310 is sharp and the needle-like member 310 has the shape of a straight rod as a whole, the shape and size of the needle-like member 310 of the invention are not particularly limited and can be appropriately adjusted so as to correspond to the shape and size of a desired bubble-forming passage 410.

Further, it is preferable that the material of the needle-like member includes a metal material of which Rockwell hardness is 50 HRC or more.

The reason for this is that there is a case in which the tip portion of the needle-like member 310, which is most strongly affected by the influence of heat and a mechanical resistance force, is fatigued and likely to be deformed due to repeated use at the time of insertion of the needle-like member 310 into uncured glass when Rockwell hardness is smaller than 50 HRC.

Accordingly, it is more preferable that the Rockwell hardness of the material of the needle-like member is set to a value of 55 HRC or more, and it is still more preferable that the Rockwell hardness of the material of the needle-like member is set to a value of 60 HRC or more.

Meanwhile, high-speed tool steel, cemented carbide, and the like are used as a specific material.

Further, it is preferable that the contact angle of a material, which forms the surface of the needle-like member, with respect to pure water at a temperature of 25° C. is set to 55° or more.

The reason for this is that there is a case in which not only the needle-like member is likely to be deformed but also a part of uncured glass adheres to the needle-like member at the time of pullout of the needle-like member and a trouble is caused at the time of the next insertion of the needle-like member since the affinity between the needle-like member and uncured glass is increased and resistance is increased at the time of insertion and pullout of the needle-like member when the contact angle is set to a value smaller than 55°.

Accordingly, it is more preferable that the contact angle of the material, which forms the surface of the needle-like member, with respect to pure water at a temperature of 25° C. is set to a value of 60° or more, and it is still more preferable that the contact angle of the material, which forms the surface of the needle-like member, with respect to pure water at a temperature of 25° C. is set to a value of 65° or more.

Meanwhile, the detail of a method of measuring the contact angle will be described in Example.

Further, it is preferable that the needle-like member includes a surface coating layer.

The reason for this is that a predetermined bubble-forming passage may be more stably formed, the reverse teardrop-shaped internal space to be formed thereafter may be more stably formed, a bubble independent of the outside is more stably formed eventually, and the position and size of the bubble may be more accurately controlled since the alteration of the surface of the needle-like member may be suppressed when the needle-like member includes the surface coating layer.

Further, the surface coating layer can be formed by various methods having been publicly known. Examples of the surface coating layer include an industrial chromium-plating layer that is formed by an electroplating method, a nickel-plating layer that is formed by an electroless plating method, and Ti-based hard film layers, such as a TiN film and a TiAlN film, and Cr-based hard film layers, such as a CrN film, a CrAlN film, and a CrVN film, which are formed by a physical vapor deposition method (PVD) or a chemical vapor deposition method (CVD).

It is particularly preferable that an industrial chromium-plating layer is used among these layers since the industrial chromium-plating layer can prevent the oxidation of the material of the needle-like member and effectively reduce friction between the needle-like member and glass.

Further, an industrial chromium-plating layer can be formed by a publicly known method in the related art that uses Sargent bath or a fluoride bath.

Meanwhile, the surface coating layer may be formed of a single layer or may be formed of a plurality of layers.

Further, it is preferable that the thickness of the surface coating layer is set to a value within the range of 0.01 to 100 μm.

The reason for this is that there is a case in which it is difficult to obtain a predetermined effect based on the surface coating layer since the surface coating layer is excessively thin when the thickness of the surface coating layer is set to a value smaller than 0.01 μm. Meanwhile, the reason for this is that there is a case in which the surface coating layer is likely to be separated and remains in the glass container as a foreign matter since the surface coating layer is excessively thick when the thickness of the surface coating layer is set to a value exceeding 100 μm.

Accordingly, it is more preferable that the lower limit of the thickness of the surface coating layer is set to a value of 0.1 µm or more, and it is still more preferable that the lower limit of the thickness of the surface coating layer is set to a value of 1 µm or more.

Furthermore, it is more preferable that the upper limit of the thickness of the surface coating layer is set to a value of 50 µm or less, and it is still more preferable that the upper limit of the thickness of the surface coating layer is set to a value of 10 µm or less.

EXAMPLE

The method of manufacturing a glass container of the invention will be described in detail below on the basis of Example. However, it goes without saying that the invention is not limited to the following description.

Example 1

1. Manufacture of Glass Container
(1) Step (A)
As illustrated in FIGS. 2(a) to 2(c), a parison was molded by counterblow after a gob (253 g, 1150° C.) of soda-lime glass was put into the rough mold.

Then, as illustrated in FIGS. 3(a) to 3(d), a glass container, in which a bubble is not yet formed and the thickness of a bottom portion in the longitudinal direction was 28 mm and the maximum diameter of the bottom portion was 42 mm, was molded after the parison is moved to the finishing mold.

(2) Step (B)
Next, after a needle-like member (the shape of a tip portion: conical shape, the length of the tip portion: 10 mm, the length of a body portion: 28 mm, and the maximum diameter of the body portion: 2 mm) having a circular cross-sectional shape was inserted into the bottom portion of the glass container, in which a bubble is not yet formed, by 14 mm from the bottom face toward the upper side in the vertical direction as illustrated in FIGS. 4(a) and 4(b), the needle-like member was pulled out to form a bubble-forming passage.

Further, a time, which was to elapse until the needle-like member started to be inserted, was set to 0.15 sec immediately after the completion of the step (A), a time, which was to elapse until the needle-like member started to be pulled out, was set to 0.18 sec immediately after the completion of the insertion of the needle-like member.

Furthermore, a member, which used a high-speed tool steel material (SKH51, Rockwell hardness: 63HRC) prescribed in JISG4403:2006 as a base material thereof and of which the surface was plated with hard chromium (thickness: 5 µm, a contact angle with respect to pure water at a temperature of 25° C.): 70°, was used as the needle-like member.

Moreover, in regard to the contact angle of a material, which forms the surface of the needle-like member, with respect to pure water at a temperature of 25° C., the same plating layer as the plating layer formed on the surface of the needle-like member is formed on a flat plate that is made of a high-speed tool steel material used as the base material of the needle-like member, and measurement based on a contact method of JIS3257:1999 was performed on the surface of the flat plate including the plating layer.

Further, the insertion and pullout of the needle-like member were controlled using a pneumatic cylinder (SMG manufactured by CKD Corporation).

Furthermore, a bubble-forming passage having the same diameter as the diameter of the needle-like member was formed immediately after the needle-like member was pulled out.

(3) Step (C)
Next, as illustrated in FIGS. 5(a) to 5(c), room-temperature air was injected with a pressure of 0.2 MPa from the inlet of the bubble-forming passage so that a total volume of the room-temperature air was 25 ml.

Figure 8:
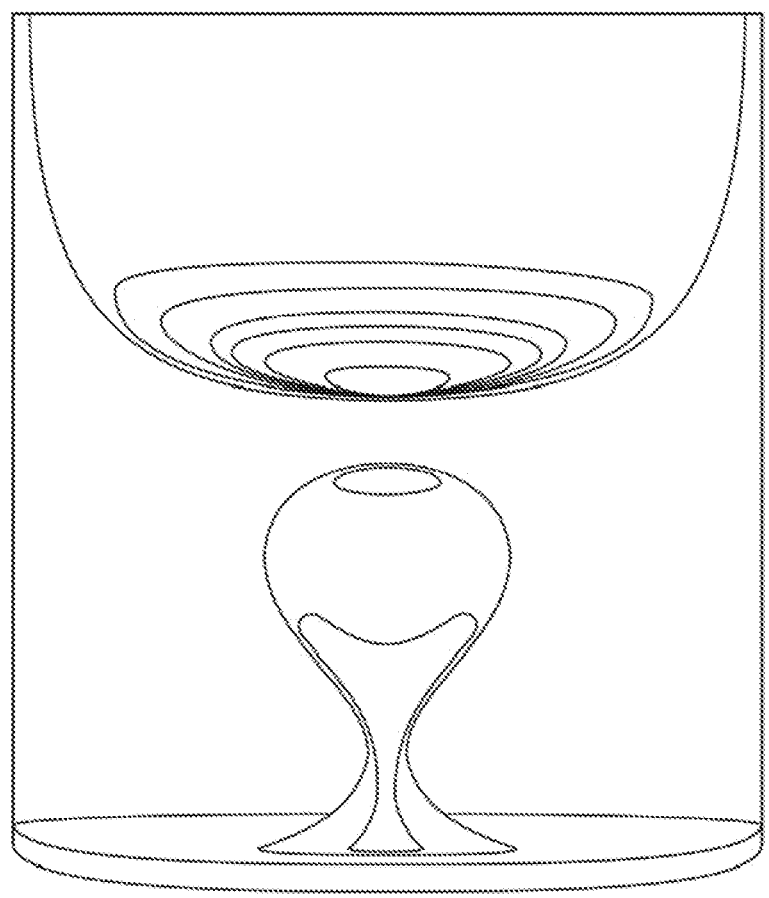
FIG. 8 is a diagram illustrating the photograph of a glass container that is obtained from a step (C) of Example 1.

Then, a reverse teardrop-shaped internal space, which is widened in the bottom portion from the bubble-forming passage as a starting point and has the maximum diameter of 11 mm and the minimum diameter of 1.8 mm, was formed in the bottom portion of the glass container in which a bubble is not yet formed and a glass container, which is illustrated in FIG. 5(c) and includes an internal space formed in the bottom portion and communicating with the outside, was obtained. FIG. 8 illustrates the photograph of the appearance of the obtained glass container, and a diagram created on the basis of the photograph of the appearance.

Meanwhile, FIG. 8 is an image of the glass container that is taken immediately after the glass container is taken out of the finishing mold and placed on the dead plate, and it is confirmed that the reverse teardrop-shaped internal space is being deformed due to surface tension immediately after the injection of air but is reliably formed in the step (C).

Further, the central portion of the photograph of the appearance of the glass container of FIG. 8 is seen to be white, but actually emits orange-colored light due to potential heat. Accordingly, it is confirmed that uncured glass having high flowability is present in the bottom portion of the glass container.

Figure 9:
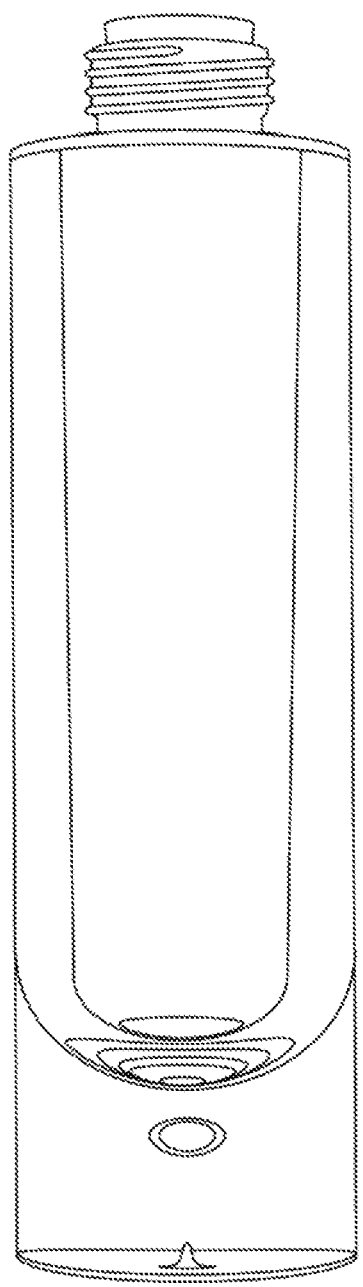
FIG. 9 is a diagram illustrating the photograph of a glass container that is manufactured in Example 1.
Figure 10:
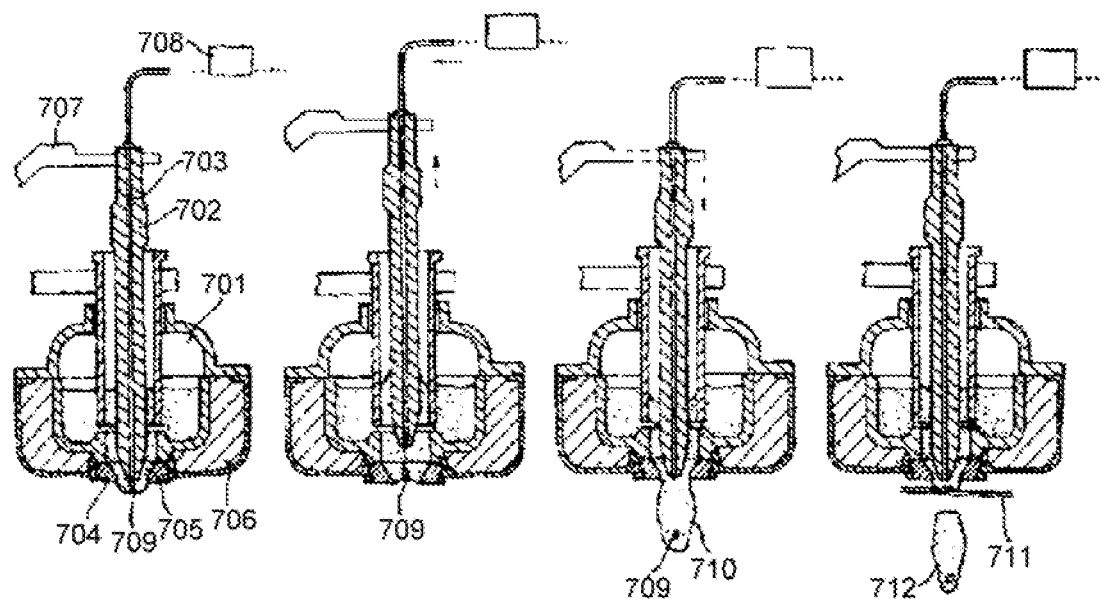
FIG. 10 is a diagram illustrating a method of manufacturing a glass container in the related art.
Figure 10:
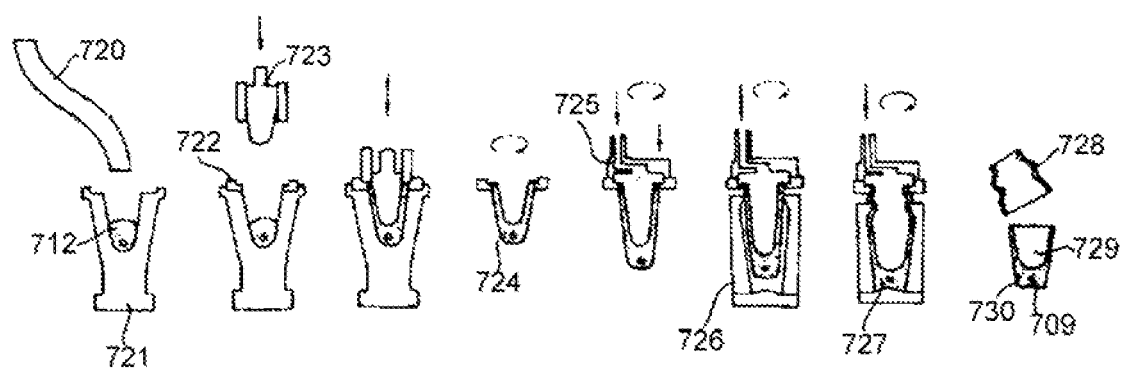
Figure 11:
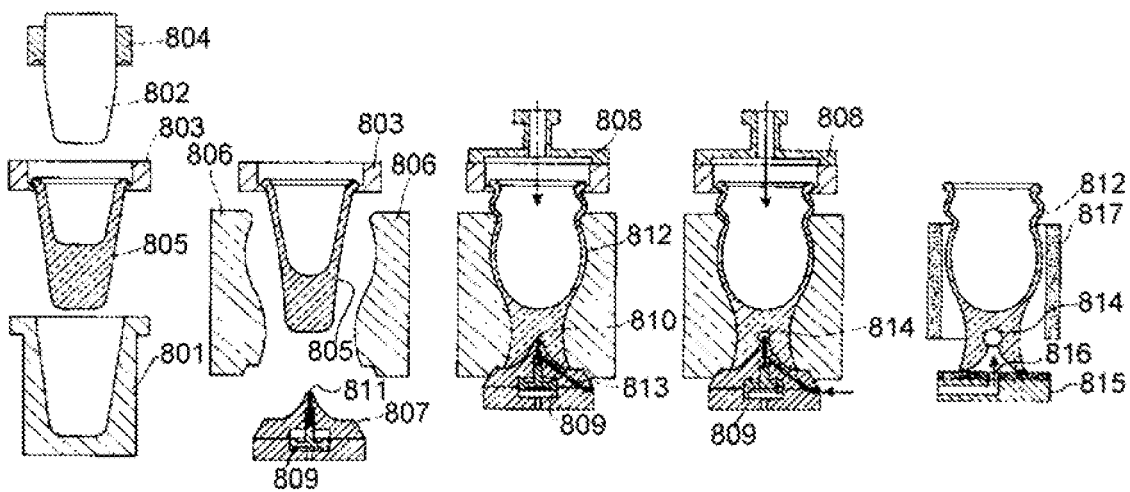
FIG. 11 is another diagram illustrating the method of manufacturing glass container in the related art.

(4) Step (D)
Next, as illustrated in FIGS. 6(a) to 6(c), the glass container, which includes the internal space formed in a thick portion of the bottom portion and communicating with the outside, was taken out of the finishing mold and was then placed on the dead plate and the inlet side of the reverse teardrop-shaped internal space was closed by the flow of uncured glass, which is caused by the potential heat of uncured glass. As a result, a glass container, which includes an oval spherical bubble formed in the bottom portion, having the maximum diameter of 8 mm, and independent of the outside, was obtained. FIG. 9 illustrates the photograph of the appearance of the glass container.

Further, 20000 glass containers were manufactured through the repetition of the steps (A) to (D). As a result, yield was 80%.

INDUSTRIAL APPLICABILITY

According to the method of manufacturing a glass container of the invention, as described above in detail, a predetermined passage was formed in a bottom portion of a glass container, which is molded from molten glass and in which a bubble is not yet formed, by a needle-like member and air was then injected into the passage, so that an internal space having a predetermined shape could be formed.

Further, the inlet side of the internal space having a predetermined shape was stably closed by the flow of uncured glass, which uses reheating caused by the potential heat of uncured glass, so that a bubble independent of the outside could be accurately formed in the bottom portion.

Accordingly, it is expected that the method of manufacturing a glass container of the invention will significantly contribute to the improvement of the designability of a cosmetic container and the like.

EXPLANATIONS OF LETTERS OR NUMERALS

10: rough mold base part
12: molding portion
13: mouth portion-molding portion
20: mouth mold
30: guide ring
50: plunger
52: blowing hole
60: baffle
70: gob
71: parison
72: funnel
80: rotating device
82: arm
90: blow head
91: counterblow air
92: final-blow air
100: rough mold
120: dead plate
200: glass container that includes bubble formed in bottom portion and independent of outside
202: mouth portion
204: body portion
206: bottom portion
208: receiving portion
210: bubble
212: dent
300: finishing mold
301: finishing mold base part
302: bottom mold
303: internal space
304: bottom face-molding portion
305: opening portion
306: drive device
307: air supply passage
310: needle-like member
400: glass container in which bubble is not yet formed
410: bubble-forming passage
412: passage portion
414: tip portion
500: glass container that includes internal space formed in bottom portion and communicating with outside
510: reverse teardrop-shaped internal space
600: IS machine

The invention claimed is:

1. A method of manufacturing a glass container that includes a mouth portion, a body portion, and a bottom portion, the method comprising:
   a step (A) of molding a glass container, in which a bubble is not yet formed, from molten glass;
   a step (B) of forming a bubble-forming passage by pulling out a needle-like member after inserting the needle-like member into a bottom portion of the glass container, in which a bubble is not yet formed, from a bottom face;
   a step (C) of injecting air from an inlet of the bubble-forming passage to form an inverted teardrop-shaped internal space, which is widened in the bottom portion from the bubble-forming passage as a starting point, in the bottom portion of the glass container in which a bubble is not yet formed, and to obtain a glass container that includes an internal space formed in the bottom portion and communicating with the outside; and
   a step (D) of closing an inlet side of the inverted teardrop-shaped internal space of the glass container, which includes the internal space formed in the bottom portion and communicating with the outside, by flow of not yet solidified glass, which is caused by the potential heat of the not yet solidified glass, to obtain a glass container that includes a bubble formed in the bottom portion and independent of the outside,
   wherein in the step (B), a time, which is to elapse until the needle-like member starts to be inserted, is set to a value within the range of 0.01 to 0.5 sec immediately after the completion of the step (A) and a time, which is to elapse until the needle-like member starts to be pulled out, is set to a value within the range of 0.05 to 0.5 sec immediately after the completion of the insertion of the needle-like member.

2. The method of manufacturing a glass container according to claim 1,
   wherein in the step (B), the shape of the cross-section of the bubble-forming passage, which is formed immediately after the needle-like member is pulled out, taken along a plane orthogonal to an axis of the bubble-forming passage is at least one selected from the group consisting of a circular shape, an oval shape, and a polygonal shape.

3. The method of manufacturing a glass container according to claim 1,
   wherein in the step (B), an insertion direction of the needle-like member is set to correspond to an upward movement in a vertical direction.

4. The method of manufacturing a glass container according to claim 1,
   wherein the maximum diameter of the bubble independent of the outside is set to a value within the range of 2 to 30 mm.

5. A method of manufacturing a glass container that includes a mouth portion, a body portion, and a bottom portion, the method comprising:
   a step (A) of molding a glass container, in which a bubble is not yet formed, from molten glass;
   a step (B) of forming a bubble-forming passage by pulling out a needle-like member after inserting the needle-like member into a bottom portion of the glass container, in which a bubble is not yet formed, from a bottom face;
   a step (C) of injecting air from an inlet of the bubble-forming passage to form an inverted teardrop-shaped internal space, which is widened in the bottom portion from the bubble-forming passage as a starting point, in the bottom portion of the glass container in which a bubble is not yet formed, and to obtain a glass container that includes an internal space formed in the bottom portion and communicating with the outside; and
   a step (D) of closing an inlet side of the inverted teardrop-shaped internal space of the glass container, which includes the internal space formed in the bottom portion and communicating with the outside, by flow of not yet solidified glass, which is caused by the potential heat of the not yet solidified glass, to obtain a glass container that includes a bubble formed in the bottom portion and independent of the outside,
   wherein in the step (B), the depth of the bubble-forming passage from the bottom face, which is obtained immediately after the needle-like member is pulled out, is set to a value within the range of 20 to 80% of the thickness of the bottom portion in a longitudinal direction.

6. A method of manufacturing a glass container that includes a mouth portion, a body portion, and a bottom portion, the method comprising:
- a step (A) of molding a glass container, in which a bubble is not yet formed, from molten glass;
- a step (B) of forming a bubble-forming passage by pulling out a needle-like member after inserting the needle-like member into a bottom portion of the glass container, in which a bubble is not yet formed, from a bottom face;
- a step (C) of injecting air from an inlet of the bubble-forming passage to form an inverted teardrop-shaped internal space, which is widened in the bottom portion from the bubble-forming passage as a starting point, in the bottom portion of the glass container in which a bubble is not yet formed, and to obtain a glass container that includes an internal space formed in the bottom portion and communicating with the outside; and
- a step (D) of closing an inlet side of the inverted teardrop-shaped internal space of the glass container, which includes the internal space formed in the bottom portion and communicating with the outside, by flow of not yet solidified glass, which is caused by the potential heat of the not yet solidified glass, to obtain a glass container that includes a bubble formed in the bottom portion and independent of the outside,
- wherein in the step (B), the maximum diameter of the bubble-forming passage, which is formed immediately after the needle-like member is pulled out, is set to a value within the range of 0.5 to 5 mm.

7. A method of manufacturing a glass container that includes a mouth portion, a body portion, and a bottom portion, the method comprising:
- a step (A) of molding a glass container, in which a bubble is not yet formed, from molten glass;
- a step (B) of forming a bubble-forming passage by pulling out a needle-like member after inserting the needle-like member into a bottom portion of the glass container, in which a bubble is not yet formed, from a bottom face;
- a step (C) of injecting air from an inlet of the bubble-forming passage to form an inverted teardrop-shaped internal space, which is widened in the bottom portion from the bubble-forming passage as a starting point, in the bottom portion of the glass container in which a bubble is not yet formed, and to obtain a glass container that includes an internal space formed in the bottom portion and communicating with the outside; and
- a step (D) of closing an inlet side of the inverted teardrop-shaped internal space of the glass container, which includes the internal space formed in the bottom portion and communicating with the outside, by flow of not yet solidified glass, which is caused by the potential heat of the not yet solidified glass, to obtain a glass container that includes a bubble formed in the bottom portion and independent of the outside,
- wherein the thickness of the bottom portion in the longitudinal direction is set to a value within the range of 20 to 100 mm, and the maximum diameter of the bottom portion is set to a value within the range of 30 to 80 mm.

8. A method of manufacturing a glass container that includes a mouth portion, a body portion, and a bottom portion, the method comprising:
- a step (A) of molding a glass container, in which a bubble is not yet formed, from molten glass;
- a step (B) of forming a bubble-forming passage by pulling out a needle-like member after inserting the needle-like member into a bottom portion of the glass container, in which a bubble is not yet formed, from a bottom face;
- a step (C) of injecting air from an inlet of the bubble-forming passage to form an inverted teardrop-shaped internal space, which is widened in the bottom portion from the bubble-forming passage as a starting point, in the bottom portion of the glass container in which a bubble is not yet formed, and to obtain a glass container that includes an internal space formed in the bottom portion and communicating with the outside; and
- a step (D) of closing an inlet side of the inverted teardrop-shaped internal space of the glass container, which includes the internal space formed in the bottom portion and communicating with the outside, by flow of not yet solidified glass, which is caused by the potential heat of the not yet solidified glass, to obtain a glass container that includes a bubble formed in the bottom portion and independent of the outside,
- wherein in the step (C), the pressure of the air is set to a value within the range of 0.05 to 0.5 MPa and a total volume of air to be used is set to a value within the range of 1 to 100 ml.

* * * * *